US012387597B2

(12) United States Patent
Banaei-Kashani et al.

(10) Patent No.: US 12,387,597 B2
(45) Date of Patent: Aug. 12, 2025

(54) SYSTEMS AND METHODS FOR SYSTEM OPTIMAL TRAFFIC ROUTING

(71) Applicant: The Regents of the University of Colorado, a Body Corporate, Boulder, CO (US)

(72) Inventors: Farnoush Banaei-Kashani, Centennial, CO (US); Robert Fitzgerald, Arvada, CO (US)

(73) Assignee: The Regents of the University of Colorado, a Body Corporate, Boulder, CO (US)

( * ) Notice: Subject to any disclaimer, the term of this patent is extended or adjusted under 35 U.S.C. 154(b) by 640 days.

(21) Appl. No.: 17/500,567

(22) Filed: Oct. 13, 2021

(65) Prior Publication Data

US 2022/0180745 A1 Jun. 9, 2022

Related U.S. Application Data

(60) Provisional application No. 63/090,928, filed on Oct. 13, 2020.

(51) Int. Cl.
*G08G 1/0967* (2006.01)
*G08G 1/01* (2006.01)
(Continued)

(52) U.S. Cl.
CPC ..... *G08G 1/096725* (2013.01); *G08G 1/0133* (2013.01); *G08G 1/093* (2013.01); *G08G 1/096833* (2013.01)

(58) Field of Classification Search
None
See application file for complete search history.

(56) References Cited

U.S. PATENT DOCUMENTS 9,755,850 B2 * 9/2017 Stolfus ................. G08G 1/0116
10,692,367 B2 * 6/2020 Nguyen ................. G08G 1/081
(Continued)

FOREIGN PATENT DOCUMENTS

CN 111210621 A * 5/2020 ............... G08G 1/09

OTHER PUBLICATIONS

Zhang, Yingya, Ning Ye, Ruchuan Wang, and Reza Malekian. 2016. "A Method for Traffic Congestion Clustering Judgment Based on Grey Relational Analysis" ISPRS International Journal of Geo-Information 5, No. 5: 71. https://doi.org/10.3390/ijgi5050071 (Year: 2016).*

(Continued)

*Primary Examiner* — Angela Y Ortiz
*Assistant Examiner* — Charles Pall
(74) *Attorney, Agent, or Firm* — Meunier Carlin & Curfman LLC

(57) ABSTRACT

According to some aspects of the present disclosure, a method for system-optimal traffic routing is disclosed. In one embodiment, the method includes: obtaining a current state of a traffic network, determining a set of active agents in the traffic network that are configured to receive a system optimal route, where each of the active agents corresponds to a vehicle of a set of vehicles, applying a batching function to the set of vehicles to create a batch of vehicles for replanning; creating sub-batches based on a spatial relationship between the vehicles and temporal relationships between the vehicles, generating a plurality of alternative paths for each of the sub-batches, generating a batch assignment for each of the sub-batches, assigning an alternative path to each agent in the set of active agents based on the batch assignment function, and transmitting the assigned alternative paths to the active agents.

14 Claims, 31 Drawing Sheets

(51) Int. Cl.
*G08G 1/09* (2006.01)
*G08G 1/0968* (2006.01)

(56) References Cited

U.S. PATENT DOCUMENTS

| | | | | |
|---|---|---|---|---|
| 2008/0071465 | A1* | 3/2008 | Chapman | G01C 21/3691 701/117 |
| 2017/0359197 | A1* | 12/2017 | Stolfus | G08G 1/0116 |
| 2018/0174449 | A1* | 6/2018 | Nguyen | G08G 1/015 |
| 2019/0293443 | A1* | 9/2019 | Kelly | G01C 21/3484 |

OTHER PUBLICATIONS

Translation of Ding (CN-111210621-A) (Year: 2020)*
Abraham, I., D. Delling, A. V. Goldberg, and R. F. Werneck, Alternative routes in road networks. Journal of Experimental Algorithmics (JEA), vol. 18, 2013, pp. 1-1.
Auld, J. A., F. de Souza, A. Enam, M. Javanmardi, M. Stinson, O. Verbas, and A. Rousseau, Exploring the mobility and energy implications of shared versus private autonomous vehicles. In 2019 IEEE Intelligent Transportation Systems Conference (ITSC), IEEE, 2019, pp. 1691-1696.
Boeing, G., OSMnx: New methods for acquiring, constructing, analyzing, and visualizing complex street networks. Computers, Environment and Urban Systems, vol. 65, 2017, pp. 126-139.
Carlino, D., S. D. Boyles, and P. Stone, Auction-based autonomous intersection management. In 16th International IEEE Conference on Intelligent Transportation Systems (ITSC 2013), IEEE, 2013, pp. 529-534.
Censi, A., S. Bolognani, J. G. Zilly, S. S. Mousavi, and E. Frazzoli, Today me, tomorrow thee: Efficient resource allocation in competitive settings using karma games. In 2019 IEEE Intelligent Transportation Systems Conference (ITSC), IEEE, 2019, pp. 686-693.
Childress, S., B. Nichols, B. Charlton, and S. Coe, Using an activity-based model to explore the potential impacts of automated vehicles. Transportation Research Record, vol. 2493, No. 1, 2015, pp. 99-106.
Chondrogiannis, T., P. Bouros, J. Gamper, U. Leser, and D. B. Blumenthal, Finding k37 shortest paths with limited overlap. The VLDB Journal, 2020, pp. 1-25.
Clements, L. M. and K. M. Kockelman, Economic effects of automated vehicles. Transportation Research Record, vol. 2606, No. 1, 2017, pp. 106-114.
Eppstein, D., Finding the k shortest paths. SIAM Journal on computing, vol. 28, No. 2, 1998, pp. 652-673.
Erhardt, G. D., S. Roy, D. Cooper, B. Sana, M. Chen, and J. Castiglione, Do transportation network companies decrease or increase congestion? Science advances, vol. 5, No. 5, 2019, p. eaau2670.
Fitzgerald, R. J. and F. Banaei-Kashani, Toward System-Optimal Route Guidance. In 2019 20th IEEE International Conference on Mobile Data Management (MDM), IEEE, 2019, pp. 91-99.
Fitzgerald, R. J., "System-Optimal Route Planning", Dissertation, 2017, 51 pages.
Fitzgerald, R. J., et al., "City-Scale System-Optimal Route Planning with Route Replanning", IEEE Big Data 2021, 10 pages.
Fitzgerald, R. J., et al., "Online Route Replanning for Scalable System-Optimal Route Planning", SIGSPATIAL '21, Nov. 2-5, 2021, Beijing, China, 4 pages.
Fukushima,M., A modified Frank-Wolfe algorithm for solving the traffic assignment problem. Transportation Research Part B: Methodological, vol. 18, No. 2, 1984, pp. 169-177.
Gao, K., Y. Zhang, A. Sadollah, A. Lentzakis, and R. Su, Jaya, harmony search and water cycle algorithms for solving large-scale real-life urban traffic light scheduling problem. Swarm and evolutionary computation, vol. 37, 2017, pp. 58-72.
García-Nieto, J., E. Alba, and A. C. Olivera, Swarm intelligence for traffic light scheduling: Application to real urban areas. Engineering Applications of Artificial Intelligence, vol. 25, No. 2, 2012, pp. 274-283.
Geisberger, R., P. Sanders, D. Schultes, and C. Vetter, Exact routing in large road networks using contraction hierarchies. Transportation Science, vol. 46, No. 3, 2012, pp. 388-404.
Hu, W., H. Wang, L. Yan, and B. Du, A swarm intelligent method for traffic light scheduling: application to real urban traffic networks. Applied Intelligence, vol. 44, No. 1, 2016, pp. 208-231.
Kriegel, H.-P., M. Renz, and M. Schubert, Route skyline queries: A multi-preference path planning approach. In 2010 IEEE 26th International Conference on Data Engineering (ICDE 2010), IEEE, 2010, pp. 261-272.
Liu, H., C. Jin, B. Yang, and A. Zhou, Finding top-k shortest paths with diversity. IEEE Transactions on Knowledge and Data Engineering, vol. 30, No. 3, 2017, pp. 488-502.
Mahmassani, H. S. and S. Peeta, Network performance under system optimal and user equilibrium dynamic assignments: implications for ATIS. Transportation Research Board, 1993, 83-93.
McNally, M. G., The four step model. Handbook of transport modelling, vol. 1, 2007, pp. 35-53.
Mousavi, S. S., M. Schukat, and E. Howley, Traffic light control using deep policy gradient and value-function-based reinforcement learning. IET Intelligent Transport Systems, vol. 11, No. 7, 2017, pp. 417-423.
Pedroso, J. P. and R. Rei, Tree Search and Simulation. In Applied Simulation and Optimization, Springer, 2015, pp. 109-131.
Peeta, S. and A. K. Ziliaskopoulos, Foundations of dynamic traffic assignment: The past, the present and the future. Networks and spatial economics, vol. 1, No. 3-4, 2001, pp. 233-265.
Thai, J., N. Laurent-Brouty, and A. M. Bayen, Negative externalities of GPS-enabled routing applications: A game theoretical approach. In 2016 IEEE 19th International Conference on Intelligent Transportation Systems (ITSC), IEEE, 2016, pp. 595-601.
Wardrop, J. G., Road paper. some theoretical aspects of road traffic research. Proceedings of the institution of civil engineers, vol. 1, No. 3, 1952, pp. 325-362.
Wilbaut, C., S. Hanafi, and S. Salhi, A survey of effective heuristics and their application to a variety of knapsack problems. IMA Journal of Management Mathematics, vol. 19, No. 3, 2008, pp. 227-244.

* cited by examiner

| Symbol | Description |
|---|---|
| G | a directed, connected, finite graph |
| $v \in V(G)$ | a vertex in the vertex set of *G* |
| $e \in E(G)$ | an edge in the edge set of *G* |
| $f(e,t)$ | count of vehicles currently on edge e at time *r* |
| $C(x)$ | edge cost/flow function, asumed nonlinear |
| $r \in R$ | a request in the set of agent routing requests |
| $O(r)$ | origin vertex of request *r* |
| $D(r)$ | destination vertex of request *r* |
| $T(r)$ | time of request *r* |
| $P_r$ | the set of possible paths for request *r* |
| $P_r = < v_0, v_1, ..., v_{n-1}, v_0 >$ | a path between vertex $v_0$ and $v_n$ for request *r* |
| $b$ | batch window duration |
| $k$ | number of (alternative) paths per request |
| $X$ | assignment matrix |

FIG. 6

| Attribute | Value |
|---|---|
| \|V(G)\| | 3158 vertices |
| \|E(G)\| | 7992 edges |
| sum of link lengths | 710.24 miles |
| average link lenght | 475 feet / 0.09 miles |
| average link speed | 20.29 miles per hour |

FIG. 7

| Symbol | Description | Value |
| --- | --- | --- |
| p | population size | 20,000 |
| a | SO adoption rate | 50% |
| b | batch window (seconds) | 30 |
| α | path assignment search computation budget (seconds) | 5 |
| | replanning minimum wait time (seconds) | (b) |
| θ | path overlap percent threshold | 50% |
| k | target number of alternate paths per request | 10 |
| c | batch function cell count | 25 |
| s | sample threshold for exhaustive search | 20.000 |

FIG. 8

| Cell Count | Cell Area ($km^2$) |
|---|---|
| 1 | 135.5 |
| 4 | 33.75 |
| 25 | 5.40 |
| 100 | 1.35 |
| 225 | 0.60 |
| 400 | 0.39 |
| 625 | 0.22 |
| 900 | 0.15 |

FIG. 9

| Symbol | Description | Value |
|---|---|---|
| p | population size | [16k, 18k, 20k, 22k, 24k] |
| a | SO adoption rate | [0%, 10%, ..., 90%, 100%] |
| b | batch window (seconds) | [5, 10, 15, 30, 60, 120, 300] |
| c | batch function cell count | [1, 4, 25, 100, 225, 400, 625, 900] |
| | batch function type | [origin, destination, current, o/d, c/d] |

FIG. 10

1 $$C^*(t) = \arg\min_{X} \sum_{e \in E(G)} C(g(e,t)) \quad (1)$$

2 s.t. $$g(e,t) = f(e,t) + \sum_{r \in R_t} \sum_{p \in P_r} In(e,p)\chi_{rp} \quad (2)$$

3 $$In(e,p) \equiv \begin{cases} 1, & \text{if } e \in p \\ 0, & \text{otherwise} \end{cases} \quad (3)$$

4 $$R_t = \{ r | r \in R, r.t \in [t, t+b] \} \quad (4)$$

5 $$\sum_{p \in P_r} \chi_{rp} = 1 \ \forall r \in R_t \quad (5)$$

6 $$\chi_{rp} = \{0,1\} \ \forall r \in R_t, p \in P_r \quad (6)$$

FIG. 12

| Symbol | Description |
|---|---|
| $G$ | a directed, connected, finite graph |
| $v \in V(G)$ | a vertex in the vertex set of $G$ |
| $e \in E(G)$ | an edge in the edge set of $G$ |
| $C(x)$ | edge cost/flow function |
| $b$ | batch window (seconds) |
| $t$ | current time (seconds) |
| $a$ | algorithm adoption rate (%) |
| $r \in R_t$ | a request in the set of agent routing requests |
| $O(r)$ | origin vertex of request $r$ |
| $D(r)$ | destination vertex of request $r$ |
| $r_t$ | time of request $r$ |
| $p_r$ | a path between vertex $v_0$ and $v_n$ for request $r$ of the form $< v_0, v_1, .., v_{n-1}, v_n >$ |
| $f$ | free-flow edge speed |
| $q$ | edge capacity |

FIG. 13

| Statistic | Golden | Lafayette | Boulder |
|---|---|---|---|
| vertices $\|V(G)\|$ | 904 | 1390 | 3158 |
| edges $\|E(G)\|$ | 2114 | 3491 | 7992 |
| sum of link lengths, miles | 219.84 | 286.77 | 710.24 |
| average link length, feet | 568 | 433 | 475 |
| average link speed, mph | 19.08 | 18.14 | 20.29 |

FIG. 14

| Scenario | Mean *TT** | Min *TT** | Trials |
|---|---|---|---|
| Golden | 9.78% | -8.63% | 84 |
| Lafayette | -10.03% | -24.89% | 78 |
| Boulder | -29.84% | -48.49% | 66 |

FIG. 15

| Symbol | Description |
|---|---|
| $G$ | a directed, connected, finite graph |
| $v \in V(G)$ | a vertex in the vertex set of $G$ |
| $e \in E(G)$ | an edge in the edge set of $G$ |
| $f(e,t)$ | count of vehicles currently on edge e at time t |
| $C(x)$ | edge cost/flow function, assumed nonlinear |
| $r \in R$ | a request in the set of agent routing requests |
| $O(r)$ | origin vertex of request r |
| $D(r)$ | destination vertex of request r |
| $T(r)$ | time of request r |
| $P_r$ | the set of possible paths for request r |
| $p_r$ | a path between vertex $v_0$ and $v_n$ for request $r$ of the form $< v_0, v_1, ..., v_{n-1}, v_n >$ |
| $b$ | batch window duration |
| $k$ | number of (alternative) paths per request |
| $X$ | path assignment matrix |

FIG. 19

```
input: request sub-batch R_i^1, edge cost/flow function C
Function ranking (R_i^1)
  | sum ← 0;
  | P^{R_i} ← Φ;
  | forall r ∈ R^i_i do
  |   | P^{R_i} ← P^{R_i} + Dijkstra(r)
  | end
  | forall p ∈ P^{R_i} do
  |   | P^C = P^{R_i} \ p;
  |   | forall e ∈ p do
  |   |   | if e ∈ P^C then
  |   |   |   | sum ← sum + C(e)
  |   |   | end
  |   | end
  | end
  | return sum
end
```

FIG. 22

| Scenario | BASE | RAND | MCTS | MCTS |
|---|---|---|---|---|
| Golden | 9.78% | -8.10% | -8.91% | -0.80% |
| Lafayette | -10.04% | -16.54% | -16.94% | -0.40% |
| Boulder | -29.85% | -35.80% | -35.90% | -0.10% |

FIG. 26

SYSTEMS AND METHODS FOR SYSTEM OPTIMAL TRAFFIC ROUTING

CROSS REFERENCE TO RELATED APPLICATIONS

This application claims priority to and incorporates entirely by reference U.S. Patent Application Ser. No. 63/090,928 filed on Oct. 13, 2020, and entitled Systems and Methods for System Optimal Traffic Routing.

STATEMENT REGARDING GOVERNMENT SUPPORT

This invention was made with government support under grant number 69A3551747108 awarded by the Department of Transportation, and funding supplied by the Department of Transportation through the Mountain Plains Consortium, grant MPC-517. The government has certain rights in the invention.

BACKGROUND

Over the last decade transportation has been evolving towards automation and electrification. The arrival of online mapping services and the emergence of mobility-as-a-service providers mark phases toward these goals. These developments promise positive economic impacts in the long term. However, these developments have also been shown to increase road network congestion [1,2], which is itself a strong indicator of a negative impact in terms of economics, emissions, and safety. These negative outcomes are strongly tied to the "selfish" nature of the user-optimal routing algorithms employed by online mapping services and mobility-as-a-service providers.

Selfish routing is implicitly integrated into the design of popular mapping systems, and so it largely drives route choice behavior for the public, for transportation network companies (TNCs), and heavy-duty vehicles alike. It is broadly understood that human behavior drives motorists to seek to optimize their own utility, leading to a sub-optimal network condition referred to as a User Equilibrium (UE) state [5]. However, seminal works in transportation simulation also describe how a system optimal (SO) route strategy can improve on this, especially in highly congested networks [6]. Improved network performance is in fact speculated outcome of large-scale connected and automated vehicle (CAV) adoption, with an estimated $1.2 trillion in economic impact, alongside improved productivity, safety, and reduced emissions [7]. These projections are based on simulations which leveraged selfish agent routing [8]; a SO routing objective can increase the positive impacts to an even greater degree. SO equilibrium has been explored in the past in the context of a macroscopic transportation simulation, where vehicles are represented as flows per time unit over some network. This high-level aggregation can simplify the research problem by removing the need to produce routes on a vehicle-by-vehicle basis, but this high-level aggregation is not applicable to the problem of generating individual routes. Similarly, these concerns can be addressed in a mesoscopic simulation by computing a system optimal (SO) batch route assignment. However, computing these one-off batch solutions can quickly become intractable for larger inputs.

It is with respect to these and other considerations that the various aspects of the present disclosure are described herein.

SUMMARY

In some aspects, the present disclosure relates to methods for system-optimal traffic routing. In one embodiment, the method includes obtaining a current state of a traffic network determining a set of active agents in the traffic network that are configured to receive a system optimal route, where each of the active agents corresponds to a vehicle of a set of vehicles in the traffic network, applying a batching function to the set of vehicles implementing a desired route-finding algorithm to create a batch of vehicles for replanning, creating, from the batch of vehicles for replanning, sub-batches based on a spatial relationship between the vehicles and temporal relationships between the vehicles, where the spatial relationship between the vehicles predicts whether the vehicles intersect spatially, and where the temporal relationship between the vehicles predicts whether the vehicles will intersect temporally, generating a plurality of alternative paths for each of the sub-batches, where the plurality of alternative paths are spatially diverse, generating a batch assignment for each of the sub-batches, assigning an alternative path to each agent in the set of active agents based on the batch assignment function, and transmitting the assigned alternative paths to the active agents.

In one embodiment, the active agent is operatively associated with the path of the vehicle that is in the traffic network.

In one embodiment, the active agents include automated vehicles.

In one embodiment, the active agents include user devices.

In one embodiment, obtaining the current state of a traffic network includes receiving traffic information from a plurality of traffic sensors.

In one embodiment, obtaining the current state of a traffic network includes receiving traffic information from the active agents.

In one embodiment, the plurality of alternative paths are identified using a tree search configured to limit the spatial overlap of the alternative paths.

In one embodiment, the batch assignment function includes a function that identifies a path that minimally contributes to an estimate of total travel time for the batch.

In one embodiment, the estimate of total travel time for the batch is based on evaluating combinations of alternative paths using a Monte Carlo tree search.

In some aspects, the present disclosure relates to a system for system-optimal traffic routing. In one embodiment, the system includes one or more processors, a memory device operatively coupled to the one or more processors and storing computer-executable instructions which, when executed by the one or more processors, cause the system to perform functions that include obtaining a current state of a traffic network, determining a set of active agents in the traffic network that are configured to receive a system optimal route, where each of the active agents corresponds to a vehicle of a set of vehicles in the traffic network, applying a batching function to the set of vehicles implementing a desired route-finding algorithm to create a batch of vehicles for replanning, creating, from the batch of vehicles for replanning, sub-batches based on a spatial relationship between the vehicles and temporal relationships between the vehicles, where the spatial relationship between the vehicles predicts whether the vehicles intersect spatially, and where the temporal relationship between the vehicles predicts whether the vehicles will intersect temporally, generating a plurality of alternative paths for each of the sub-batches, where the plurality of alternative paths are spatially diverse, generating a batch assignment for each of the sub-batches, assigning an alternative path to each agent in the set of active agents based on the batch assignment function and transmitting the assigned alternative paths to the active agents.

In one embodiment, the active agent is operatively associated with the path of the vehicle that is in the traffic network.

In one embodiment, the active agents include automated vehicles.

In one embodiment, the active agents include user devices.

In one embodiment, obtaining the current state of a traffic network includes receiving traffic information from a plurality of traffic sensors.

In one embodiment, obtaining the current state of a traffic network includes receiving traffic information from the active agents.

In one embodiment, the plurality of alternative paths are identified using a tree search configured to limit the spatial overlap of the alternative paths.

In one embodiment, the batch assignment function includes a function that identifies a path that minimally contributes to an estimate of total travel time for the batch.

In one embodiment, the estimate of total travel time for the batch is based on evaluating combinations of alternative paths using a Monte Carlo tree search.

Other aspects and features according to the example embodiments of the present disclosure will become apparent to those of ordinary skill in the art, upon reviewing the following detailed description in conjunction with the accompanying figures.

BRIEF DESCRIPTION OF THE DRAWINGS

The accompanying figures, which are not necessarily drawn to scale, and which are incorporated in and constitute a part of this specification, illustrate several aspects described below.

FIGS. 2A-D illustrate a series of steps for three-phase system optimal routing for an agent using batches, according to an embodiment of the present disclosure, wherein: FIG. 2A illustrates a step of grouping cells; FIG. 2B illustrates a batching step; FIG. 2C illustrates alternative paths; and FIG. 2D illustrates the assignment of the path to an agent.

FIGS. 4A-4D illustrate results of a simulation of an embodiment of the present disclosure, wherein: FIG. 4A illustrates performance of the system as a function of different population sizes, FIG. 4B illustrates average travel speed for selfish and system optimal routing systems; FIG. 4C illustrates the performance the system as a function of adoption rate; and FIG. 4D illustrates the performance of the system as a function of batch window duration.

FIG. 6 shows a table of definitions used to define a system optimal routing problem, according to an embodiment of the present disclosure.

FIG. 7 shows a table of simulation parameters used to test an embodiment of the present disclosure.

FIG. 8 shows a table of simulation parameters used to test an embodiment of the present disclosure.

FIG. 9 shows a table of different cell counts and corresponding cell areas used as simulation parameters.

FIG. 10 shows a table of non-limiting example values used to test an embodiment of the present disclosure. The values include values for population size, SO (System Optimal) adoption rate, batch window length, batch function cell count, and batch function cell type.

FIG. 12 illustrates equations used to formulate the problem definition for route replanning, according to one embodiment of the present disclosure.

FIG. 13 shows a table of definitions used to define a system optimal routing problem, according to an embodiment of the present disclosure.

FIG. 14 shows a table of simulation parameters used to test an embodiment of the present disclosure.

FIG. 15 shows a table of experimental results representing travel time differences (TT*) for different trials, according to an embodiment of the present disclosure.

FIG. 19 shows a table of definitions used to define a system optimal routing problem, according to an embodiment of the present disclosure.

FIG. 22 illustrates an example method for performing Agent-Proportional Overlap Sum Ranking, according to one embodiment of the present disclosure.

FIG. 24A illustrates travel time differences simulated for Golden, Colorado, FIG. 24B illustrates travel time differences for Lafayette, Colorado, and FIG. 24C illustrates travel time differences for Boulder, Colorado

FIG. 26 shows a table of experimental results representing travel time differences (TT*) for different trials, according to an embodiment of the present disclosure

DETAILED DESCRIPTION

Figure 1:
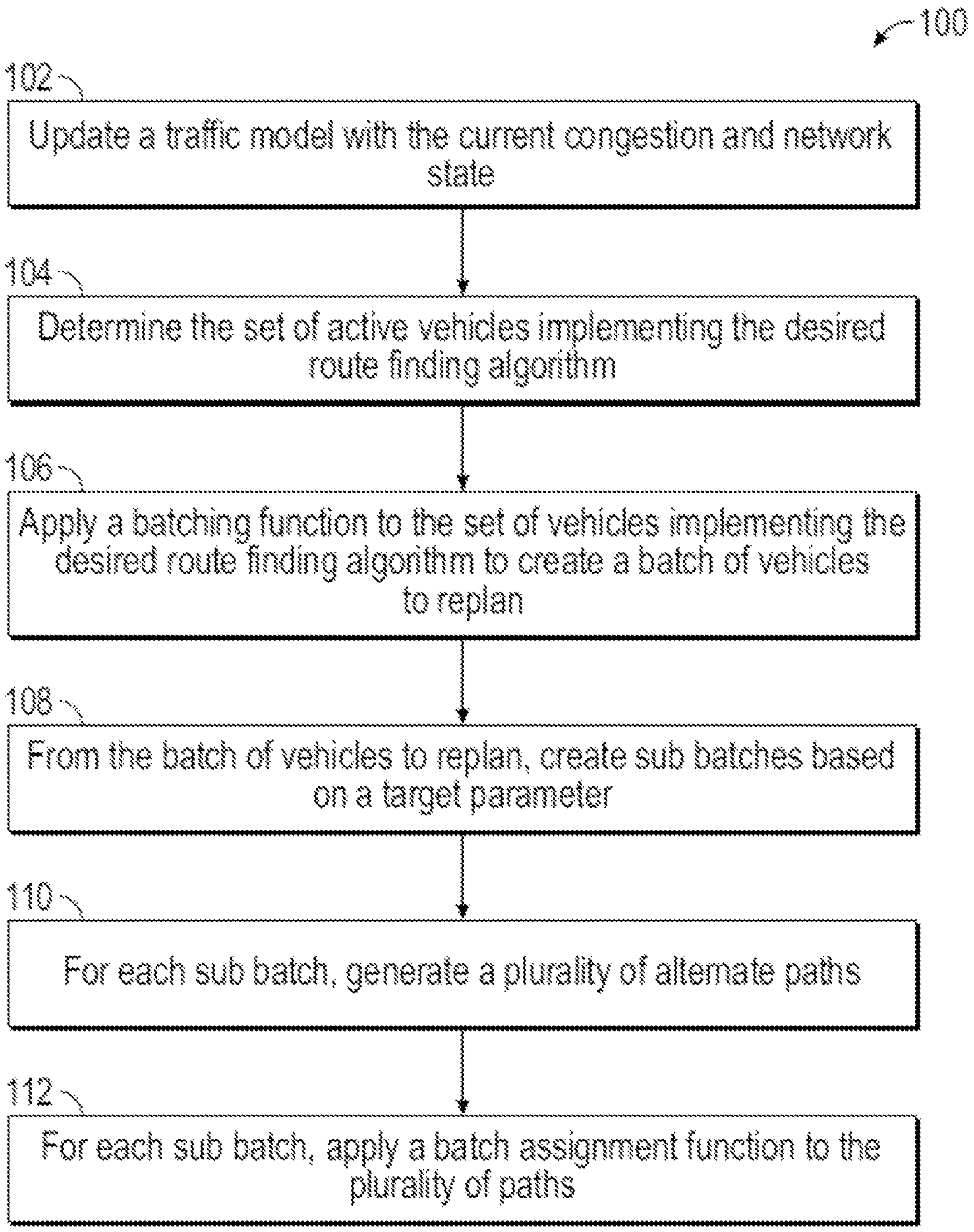
FIG. 1 illustrates a flowchart of a method for performing system optimal routing, according to an embodiment of the present disclosure.

In some aspects, the present disclosure relates to systems and methods for system optimal (SO) route planning. Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Certain values may be expressed in terms of ranges "from" one value "to" another value. When a range is expressed in terms of "from" a particular lower value "to" a particular higher value, or "from" a particular higher value "to" a particular lower value, the range includes the particular lower value and the particular higher value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more components in a device or system does not preclude the presence of additional components or intervening components between those components expressly identified.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the $n^{th}$ reference in the list. For example, "[3]" refers to the third reference in the list, namely Fitzgerald, R. J. and F. Banaei-Kashani, *Toward System—Optimal Route Guidance*. In 2019 20th IEEE International Conference on Mobile Data Management (MDM), IEEE, 2019, pp. 91-99. All references cited and discussed in this specification are incorporated herein by reference in their entireties and to the same extent as if each reference was individually incorporated by reference.

A detailed description of certain example embodiments of the present disclosure will now be provided with reference to the accompanying drawings. The drawings form a part hereof and show, by way of illustration, specific embodiments and examples. In referring to the drawings, like numerals represent like elements throughout the several figures. Some experimental data may be presented herein for purposes of illustration and should not be construed as limiting the scope of the present disclosure in any way or excluding any alternative or additional embodiments.

In one embodiment, the disclosure presents mapping, route planning, and route re-planning instructions delivered to computers for communication to individuals and/or computerized control systems installed in vehicles. To simplify the terminology herein, this disclosure pairs the concepts of network theory and systems theory to provide efficiencies in traffic routing and mapping. On one hand, physical components of traffic infrastructure within a geographic area are modeled as a network embodied in graphical elements (e.g., vertices and edges). This network corresponds to detailed information about the layout of the infrastructure that can be obtained from government resources and databases, third party vendors, or even individuals providing feedback to a computer system about road options in a given area. On the other hand, vehicles and individuals using the traffic infrastructure at any given time and place are analyzed as active agents in an overall system of the agents moving about the traffic infrastructure. From the system perspective, the network has dynamic, continually updated states that must be accounted for in terms of the number of users/agents, the goals of the users/agents, and traffic conditions that affect the users/agents.

In one embodiment, the present disclosure relates to system optimal (SO) routing techniques based on a formulation of vehicle routing algorithms which resolve individual route plans as their solution. Computing a system optimal (SO) route is a highly complex and algorithmic problem with dynamic inputs, real-time constraints, and unstable optimization conditions under a partial control scenario. Prior techniques can [3] apply real-time SO routing solution over a smaller problem size. However, scaling to larger inputs exposed that many routes can become stale during each agent trip traversal. This degrading optimality demands a more robust solution, as the greatest congestion issues are those occurring in metropolitan areas with large road networks and populations.

Disclosed herein are SO routing problem techniques based on SO routing problem formulations. Traffic conditions within a geographic area may be referred to as a network state because the geographic area and its transportation infrastructure (e.g., streets, roads, bridges, sidewalks, traffic lights, and obstacles to traffic) are modeled as a dynamic network described below. The state of the network within a physical area and/or or within a given time period determines how efficiently any one person or vehicle can traverse the geographic area under consideration. Computerized simulation methods described herein are used to determine how well identified models of the network can account for traffic changes in real time mapping and routing applications run in computer implemented software.

One non-limiting goal of this disclosure is to use up-to-date models of how a given traffic network is likely to operate for a geographic area, populate at least one of the models with state data that reflects at least one state of the traffic network, and evaluate the overall traffic network as a system of agents that are continuously subject to changes in the traffic conditions, i.e., continually subject to changing states of the network. Another non-limiting goal here is to provide route planning instructions and route replanning instructions to computers that are used with vehicles and/or people traversing the geographic area. In one non-limiting embodiment, the computers that receive route instructions are modeled as agents within an overall system, and the simulations described herein provide much needed information regarding how well a mapping and routing computer application can adapt to changing states of the traffic network. In a successful implementation, the individual agents and the system as a whole show efficiencies in travel times, distances traveled, or personal preferences for a given user. These efficiencies may also be evaluated according to batches and sub-batches of the people, vehicles, and/or agents operating within the overall system of the network.

Terms of this disclosure are given their broadest reasonable interpretation in accordance with the plain meaning of the terms. For example, a vehicle may be any individual or machine that moves from one location to another with or without passengers, including but not limited to, buses, cars, trucks, boats, and the like. In some scenarios an individual who is walking or running may be a vehicle for a computerized device that can receive routing and mapping instructions from software applications running on a network, such as but not limited to a cellular network or an internet driven network.

Embodiments of the present disclosure allow within-trip batch replanning for agents in a mesoscopic simulation. While modern mapping applications offer replanning recommendations, these can maintain the same selfish objective. In the SO batch replanning scenario, such as embodiments described herein, many replanning events can occur at a rapid and constant time interval on the order of seconds, where each replanning will attempt to minimize the nonlinear congestion effect of route assignment. Allowing for agent replanning brings with it an additional spatiotemporal batch scheduling problem, as it may be suitable to consider a subset of requests as being co-located, allowing for the decomposition of the broader search space. In one embodiment, a sub-batching heuristic algorithm clusters similar trajectories among vehicles and/or individuals traversing a geographic area modeled as a network and evaluated as a system of active agents. These sub-batches can then be processed as a group to save even more processing steps, and the sub-batches may be ranked in a hierarchy so that only a given number of the highest levels of the hierarchy are granted updated routing information. In this way, larger groups of vehicles being re-routed can generate system wide efficiencies.

Additionally, an example is described herein where an embodiment of the present disclosure is evaluated over a real city-sized road network using synthetic populations. The results show that according to one embodiment of the present disclosure, a congested road network can experience up to a 59% reduction in travel times across all agents, at the cost of increasing travel times for dis-advantaged agents by an average of 8%.

In some embodiments, the systems, methods, and software stored on computer readable media result in route planning instructions and route replanning instructions being sent to active agents. The active agents may be equipped with electronic communications systems, control systems, and audio-visual hardware and software to display, announce, or communicate in any way with an individual or a vehicle operating system to provide information regarding how to traverse a geographic area in an efficient way. Either the individual, acting as a driver, for instance, or a vehicle operating system in control of operating a vehicle, may adjust course to reflect updated instructions regarding the state of the network. In this regard, the active agent is operatively associated with the path of the vehicle that is in the traffic network.

With reference to FIG. 1, a method is described herein for finding system optimal routes for sets of vehicles. With reference to FIGS. 6 and 12, the problem can be defined using a set of formulas to model the route replanning context. G represents a road network, as a directed, fully-connected, finite graph, or network, with vertices V(G) and edges $E(G) \subseteq V(G) \times V(G)$.

Each vertex $v \in V(G)$ represents an intersection on a road network map. Each edge $e=(u, v)\ \forall e \in E(G)$ represents a road segment traversing the road network between two vertices u, $v \in V(G)$. Each edge has a positively-valued and monotonically increasing link cost/flow function C(x) which is assumed to be nonlinear.

Let R be a finite set of requests, where each request $r \in R$ captures the intent of some agent at time T(r) to seek point-to-point routing from an origin O(r) to a destination D(r), where $O(r), D(r) \in V(G)$. For each request r, there exists a set of paths $P_r$, which may be empty. Each path $p \in P_r$ is a vector the form $\langle v_0, v_1, \ldots, v_{n-1}, v_n \rangle$, where $v_0=O(r)$, $v_n=D(r)$, $(v_k, v_{k+1}) \in E(G)\ \forall 0 \leq k < n$, and $n>0$.

A SO route replanning at time t is a solution to the following nonlinear assignment problem. An algorithm seeks to select an assignment to the matrix X which minimizes the cost-flows on each edge in the road network in Equation (1), shown in FIG. 12. By setting an assignment on X, a path $p_r$ is selected for each r. Across all selected paths, the number of occurrences of each edge is counted in Equation (2) shown in FIG. 12. This is performed over requests with time value T(r) falling within a batch window [t, t+b), for some batch window duration b in Equation 4, again shown in FIG. 12. The assignment matrix X has size $R_t$ by k, where k is the maximum number of path alternatives per agent for the request batch $R_t$. The matrix X can have exactly one path selected for each request as shown in Equations 5 & 6, as shown in FIG. 12. The complete set of definitions used herein is shown in FIG. 6, and the complete list of formulas illustrating these relationships is shown in FIG. 12.

Exact solutions of the above nonlinear assignment can be intractable for all but trivial input sizes, and therefore an exemplary approximate solution is disclosed herein. In this setting, an approximate solution can be sufficient, as at each batch time, there exists the default solution of a selfish batch assignment. The power of this formulation is that small improvements, in this context, can lead to measurable and stable gains, as shall be observed in the example described below.

With reference to FIG. 1, the method 100 can include maintaining a traffic model and updating 102 that traffic model with the current congestion and network state and determining 104 a set of active vehicles implementing the desired route-finding algorithm. Embodiments of the present disclosure can be used in multiple different contexts. For example, embodiments described herein can be implemented as part of a control system for a fleet of vehicles. The fleet of vehicles may be group of vehicles operated by a corporation (e.g. a taxi or ride sharing company) or a fleet of vehicles operated by a municipality (e.g. a fleet of public busses or trams).

Embodiments of the present disclosure can be used to find optimal routing for many different types and combinations of vehicles, including busses, cars, scooters, trams, trucks, bikes, etc. Furthermore, throughout the present disclosure, "agent" is used to refer to a vehicle or individual that can receive and follow a route generated by the system. It should be understood that the "agent" can be a user device configured to supply information to a person operating a vehicle, and that the person can receive the route generated by the system or methods disclosed herein through an interface of the user device. It is also contemplated that the "agent" may be a computer system, such as a computer system that controls the actions of a connected and automated vehicle (CAV). CAV's can be able to reroute more often and more quickly than human operators, and therefore can receive additional benefits from systems and methods that provide route replanning.

The network state can be updated 102, and the set of active vehicles can be determined 104 using information from a variety of sensors and sources. Non-limiting examples of systems that can be used include TSMO (Transportation Systems Management and Operations) data as well as data collected by companies such as INRIX and Wejo. Additionally, agents using the system disclosed herein can supply information to the system that the system can use to use for updating 102 the network state and determining the list of active vehicles. For example, agents can notify the system of the local conditions around the agent (e.g. the agent can inform the system that the network state near the agent is congested).

Further, the method 100 can include steps for batching 106, generating alternate paths 110, and assigning the alternate paths 112. In batching 106, a large set of requests seeking SO replanning is split into sub-batches 108. A set of alternative paths can be produced for each request 110. A single path can be selected 112 for each request in each batch which minimally contributes to the travel time estimate for the batch.

Still with reference to FIG. 1, at the time of batching 106 many agents may need to be replanned. The eventual path assignment can be required to make a selection from a problem space which can grow exponentially with the size of the batch. However, there are likely many requests for trips which will not encounter one another, and so this batch can be pruned into sub-batches by either spatial or temporal heuristics. In the spatial dimension, trips with route plans which encounter the same subset of the road network graph can be grouped. In the temporal dimension, a batching can focus on estimated points in the future instead of using current agent locations. The batch window of the problem definition can also itself be thought of as a temporal batching heuristic. In an ideal scenario, the batching 106 function can consider only routes over the duration of the following batch window, and groups requests based on the estimated link-level interactions of their current route plans, replanning as necessary. By creating these sub-batches 108, the subsequent search space can minimized.

Figure 2D:
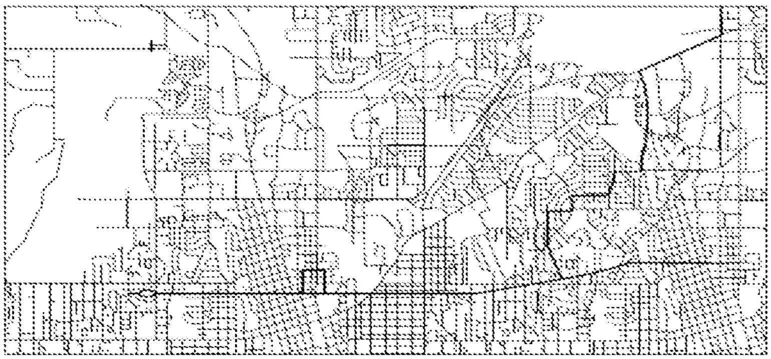
Figure 2C:
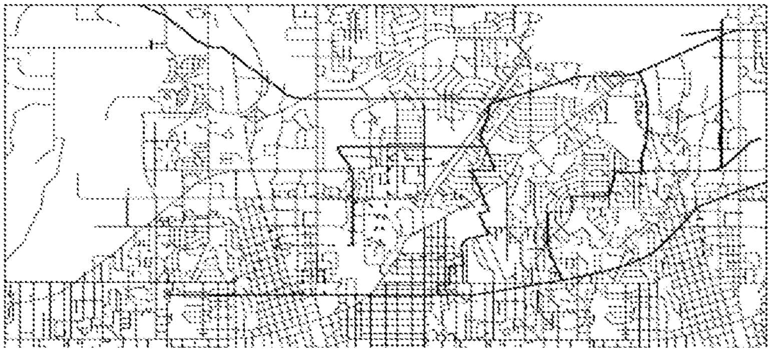
Figure 2B:
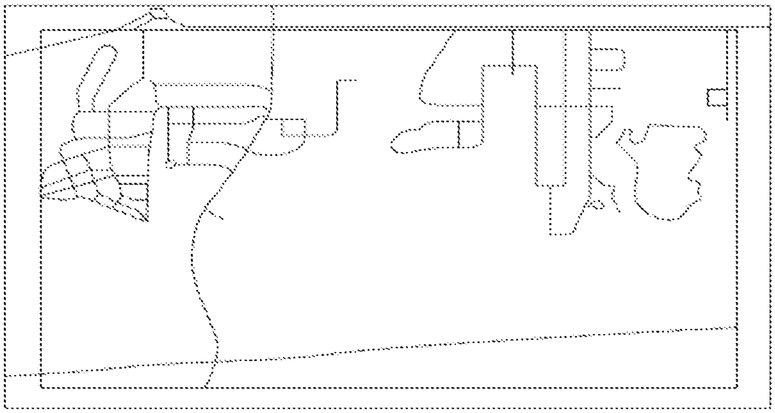
Figure 2A:
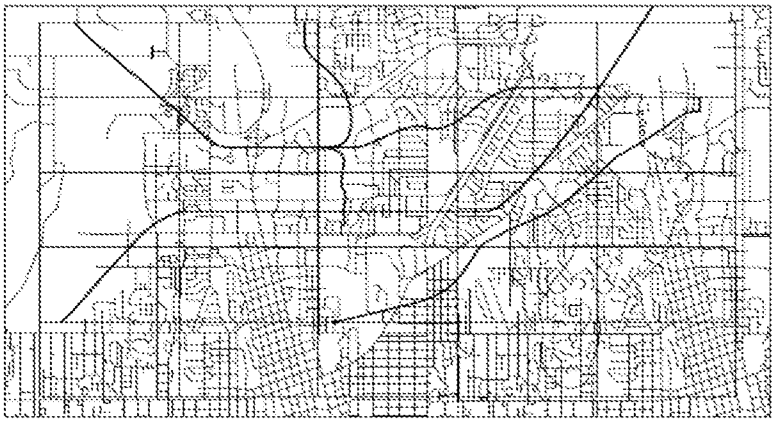

For example, as described below, a simple raster layer can be super-imposed over the study area, defining a set of c square grid cells used for grouping. To assign batches 106, each request location can be mapped to its intersecting grid cell. Requests matching the same grid cell are grouped. The request can submit origin, current location, and destination points for grouping, as well as combinations for multi-cell groupings such as origin/destination and current location/destination. FIG. 2B illustrates a batch grouping for 3 agents using their current trip location at time t.

Again, referring to FIG. 1, in step 110 a plurality of alternative paths can be identified. In order to consider path assignments which are not selfish, a set of viable alternatives can be generated. An existing algorithm for generating path alternatives is a k-shortest path algorithm [10, 11]. While these approaches can be effective, they are limited in the SO context. First, they require the computation of repeated spanning tree searches, which is inefficient and impacts the online runtime requirements of a SO algorithm. Second, these approaches make no guarantee on the spatial diversity of the discovered paths. Path diversity is desirable as an alternative to the selfish travel time-optimal cost function of path search. Without spatial diversity, the three-phase algorithm may not discover or prioritize alternatives to routes which are agent-optimal but overlap with other agent routes.

For these reasons, the Single-Via Paths (SVP) variant of the k-Shortest Paths with Limited Overlap (kSPwLO) algorithm can be used in this phase. This algorithm performs one bi-directional spanning tree search, limiting search runtime, and provides guarantees on the spatial overlap of the path results according to a percent link overlap threshold parameter q. The alternative path set for each agent can be computed independently or pre-computed offline for some origin/destination pair. The cost function used to compare path quality is the free flow travel time of each path. FIG. 2C demonstrates a set of diverse alternate paths for three agents in a batch.

With reference to FIG. 1, from the grouped set of n agents and their k alternative paths per agent, an assignment 112 of a single path per agent can be found which minimally contributes travel times to the road network, as measured by Equation 1 shown in FIG. 12. This step 112 can be defined as a multi-choice knapsack problem (MCKP) [25], with complexity $O(k^n)$. While some techniques exist to solve knapsack problems, most include the assumption that problem weights are independent. That assumption is broken in this context, where the cost function of a capacitated road network link is assumed a nonlinear function of link speed, capacity, and flow. Alternatively, a Monte Carlo Tree Search (MCTS) algorithm, modified for combinatorial search, can be leveraged [26]. This algorithm treats the search subspaces as distributions to sample from, which allows the search to model the uncertainty on the effects of the non-linear combinations. The search is bootstrapped with the selfish assignment and selfish assignment cost, which effectively sets a lower bound on the search result. A candidate partial selection is chosen by a Selection Policy which best satisfies an exploitation/exploration trade-off. From this partial selection, a complete selection is computed in the Simulation Policy by a random process.

To evaluate the simulated complete selection, an estimate on the congestion effects is measured. When a specific edge occurs in more than one selected path, the number of occurrences is counted, per Equation 2. This estimated edge flow is then fed into the Bureau of Public Roads (BPR) cost/flow function [27] as shown in Equation 7 (defined above), where q is the road segment capacity scaled to the batch window duration, f is the free-flow travel speed per hour, and d is the segment distance. The BPR cost function is selected for simplicity in modeling the travel time behavior of queued vehicles in a queue simulation. MCTS is an anytime search algorithm, meaning that it can be interrupted after any number of iterations to provide a best result, making it suitable for online and approximate computation.

In the case of small problem sizes where, for a batch of n agents, the complete search space of $k^n$ combinations is less than some threshold s, an exhaustive search is used in place of MCTS which has an equivalent runtime performance. FIG. 2D shows the selected routes for three agents in a batch.

Some embodiments of the present disclosure can include methods for improving the speed of the route planning or replanning. In some embodiments of the present disclosure, the route planning problem can be addressed when the problem can be decomposed into sub-problems suitable for parallel computation. While k-shortest paths is a sequential algorithm, similarity clustering can be parallelized using a technique such as power iteration clustering, and combinatorial search can decompose sub-spaces into parallel sampling nodes. This can be considered as a "parallel combinatorial search for route planning" which can include Apache Spark, clustering by similarity in a distributed dataset using Power Iteration clustering, Decomposed MCTS Tree Search (e.g. DABTree, a combinatorial search using Monte Carlo Tree Search), and/or Parallel Three-Phase System-Optimal Route planning. It should be understood that different combinations and variations of these techniques can be used in various embodiments of the present disclosure.

Some embodiments of the present disclosure can include reinforcement learning. Reinforcement learning can learn through repetition a control policy for non-stationary problems such as route planning. This can be referred to as Learning System-optimal assignments via multi-agent reinforcement learning. In some embodiments of the present disclosure, the Learning system-optimal assignments via multi-agent reinforcement learning can include multi-agent RL and QMIX (a Monotonic Value Function Factorization for Deep Multi-Agent Reinforcement Learning), and sub-optimal route planning with QMIX. Again, different combinations of these techniques are contemplated by the present disclosure, and the present disclosure contemplates that reinforcement learning methods can be used in combination with the different embodiments of the present disclosure.

Example 1

A non-limiting example of an embodiment of the present disclosure is described below. To review the performance of an embodiment of the present disclosure in a city-sized network, a MATSim [28] scenario was developed. OpenStreetMap [29] was the source of the road network data for the city of Boulder, Colorado, which was cleaned and modified for MATSim using the OSMnx Python library [30]. As noted above, MATSim is one non-limiting open source frame work to implement transportation simulations based on models of transportation infrastructure in a geographic area.

Figure 3:
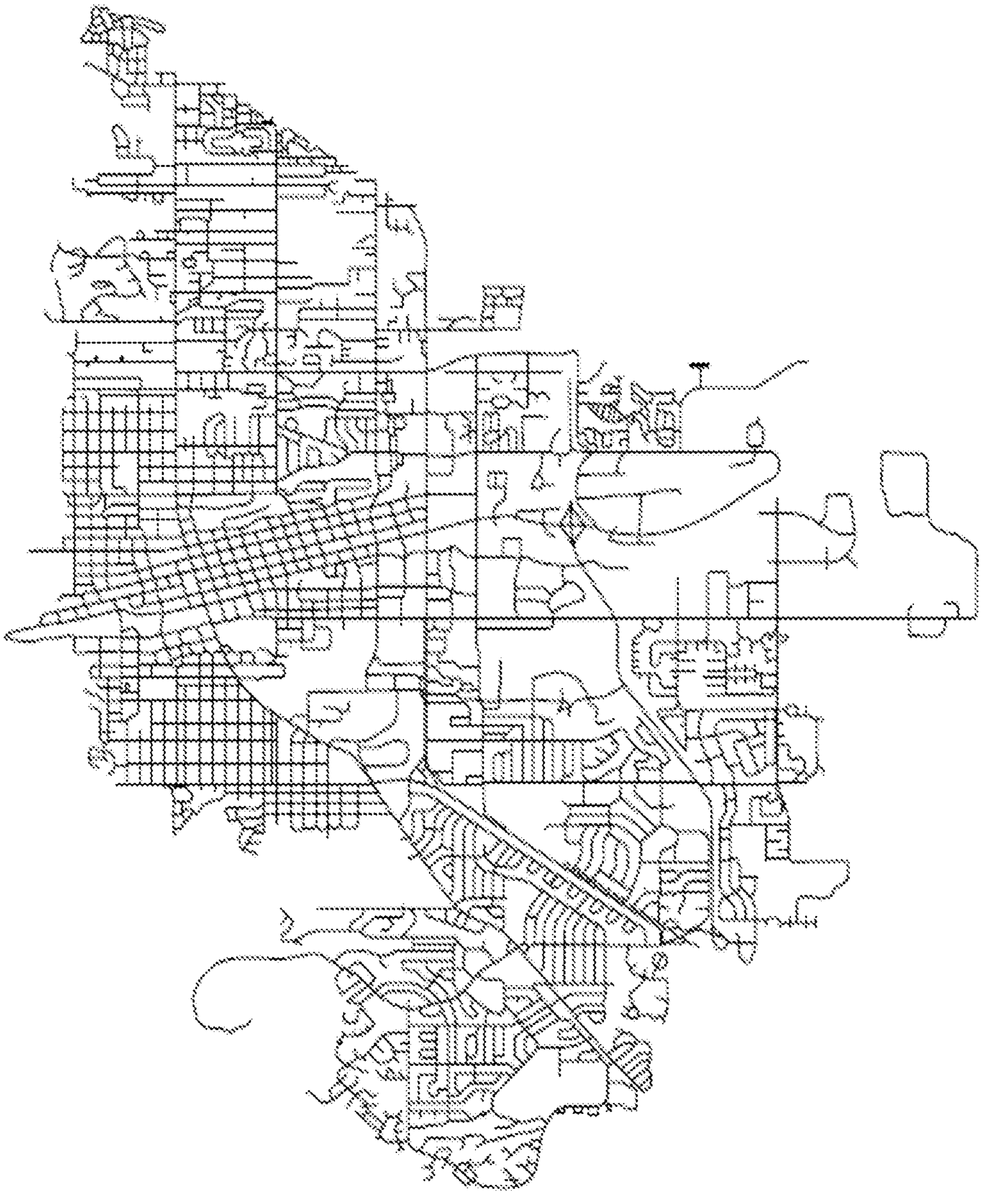
FIG. 3 illustrates a road network based on the road network of Boulder, Colorado.

The resulting road network is shown in FIG. 3 and its attributes summarized in FIG. 7. In each experiment, agents were assigned either a selfish or system optimal routing algorithm, based on sampling from an adoption rate parameter a. The selfish algorithm finds a shortest path by way of Dijkstra's algorithm, using current network conditions. This algorithm was chosen as a baseline instead of running an equilibrium solver so as to best imitate a population of vehicles leveraging modem (algorithmic) mapping applications for their route choices. The optimal algorithm uses the proposed three-phase within-trip batch replanning algorithm with default parameters shown in FIGS. 4A-4B as well as current network conditions. Populations were synthetically generated using a uniform distribution over the road network link space. Work departure times were also uniformly sampled in the range [8:30 am, 9:30 am], and 1 hour work activity, to simulate commuter behavior. Uniform sampling is a very rough approximation of real traffic demand but was chosen for algorithmic evaluation in order to avoid any bias on algorithm performance. It is expected that real populations would perform similarly. In order to review the performance of within-day batch replanning, the following parameters were explored. The selected population size was varied in a range to find low, medium, and high congestion effects, with the expectation that a medium congestion state would be most favorable. The batch window of the algorithm was varied between short and long batch sizes, with the expectation that very frequent replanning events would add too much noise to the network, and infrequent replanning would not respond sufficiently fast enough to changing network conditions. The adoption rate of the SO algorithm was varied from 0% to 100% to explore all gradations of integration of the selfish and SO populations. The number of batch groupings was varied from a single batch group to 900 batch groups, as shown in FIG. 9.

Figure 4A:
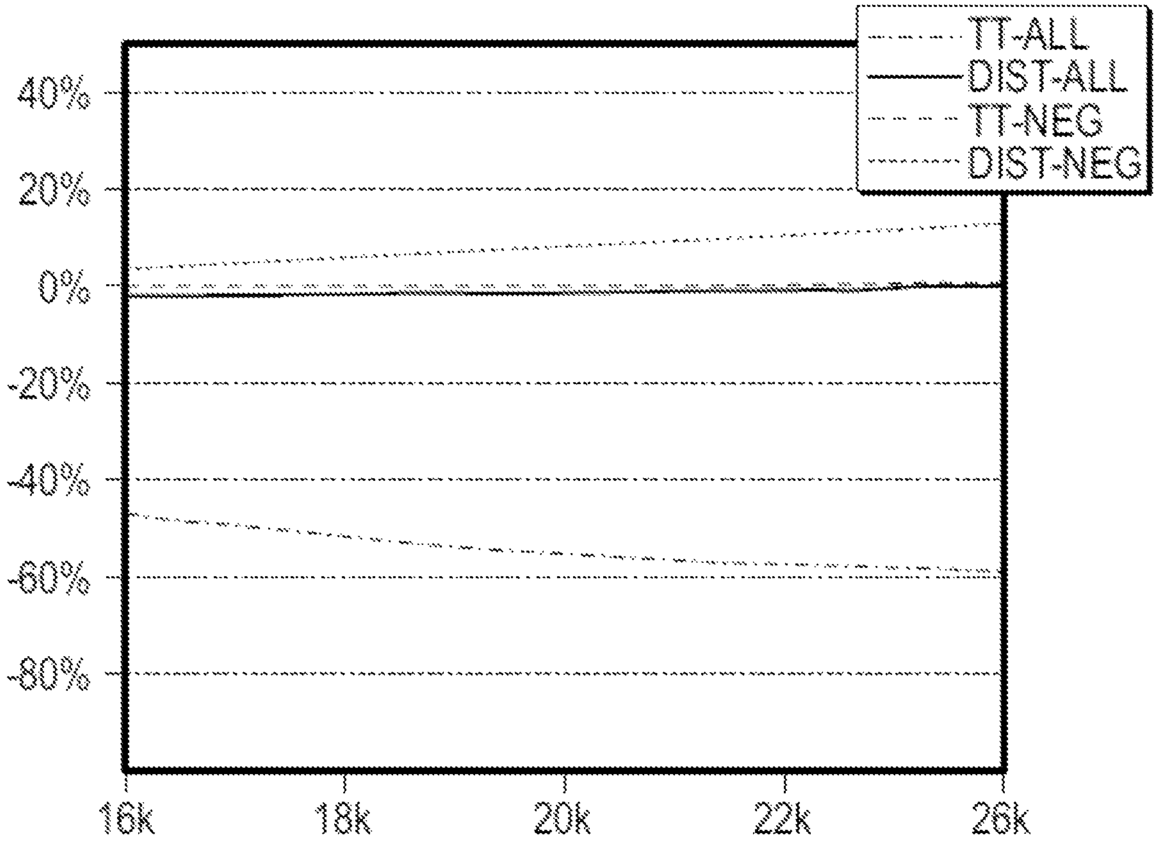
Figure 4B:
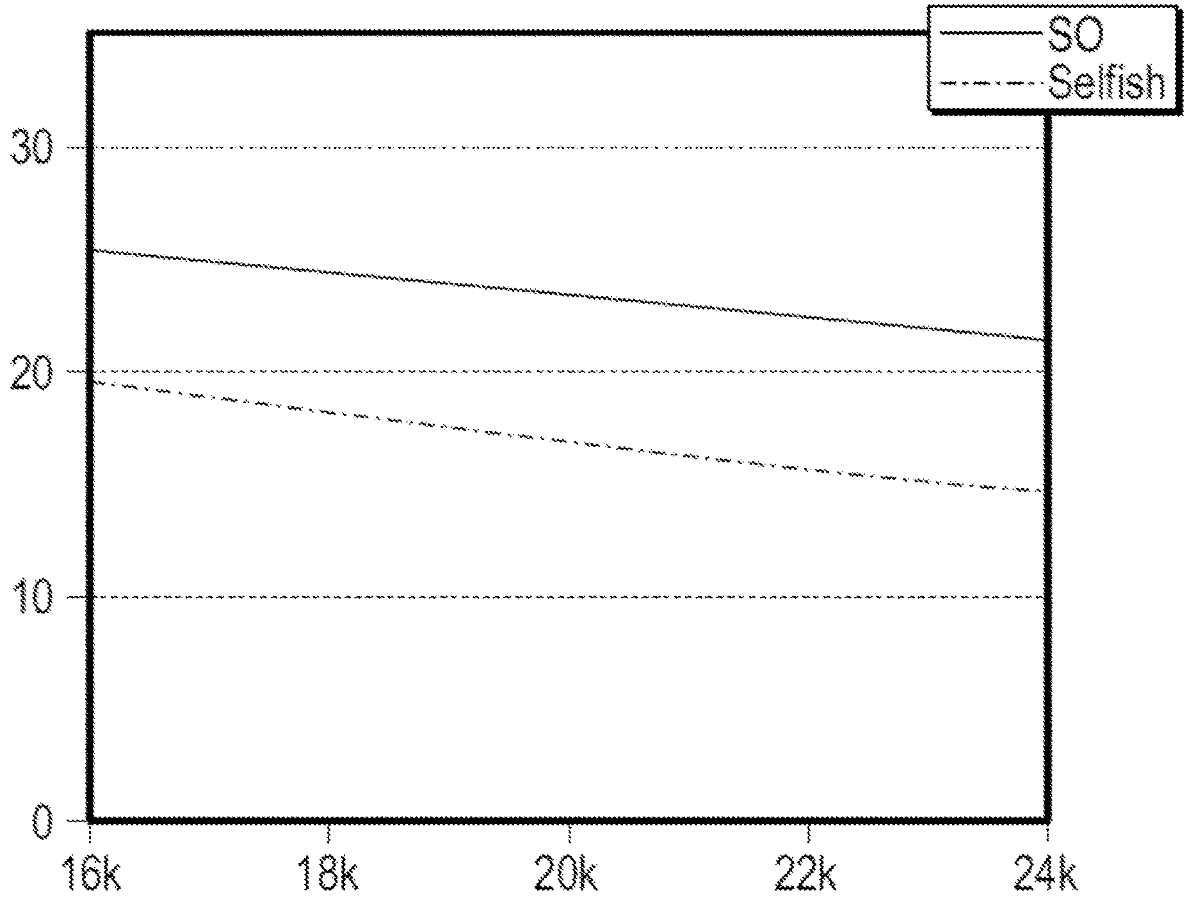
Figure 4C:
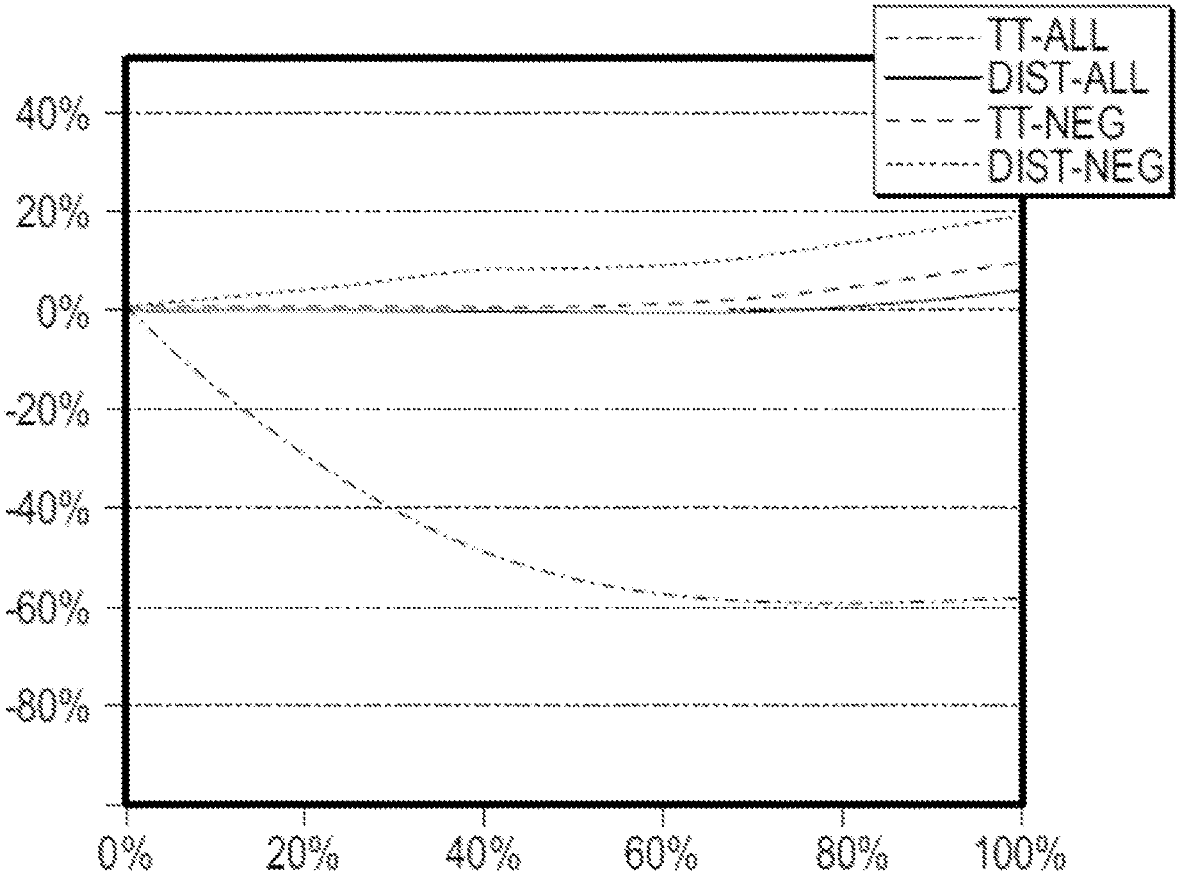

To measure the performance of a configuration, the trip experiences were compared on an agent-by-agent basis between the baseline (selfish) and test (optimal) simulation playout. Two metrics, travel time and distance, were observed for each agent, where each data point was aggregated in the form of an average offset, as shown in Equation 8, where a is a driver agent, s(a) is the selfish measure, and o(a) is the optimal measure. For each measure, we consider it for the entire population, as well as for the subset of agents who only see dis-improvement, in order to capture the externality of SO routing. The measures are identified using the shorthand TT-ALL, DIST-ALL, TT-EXT, and DIST-EXT in the following experimental results. In FIGS. 4A and 4C, the experimental results that are labeled "-NEG" include experimental observations that quantify negative externalities. For example, "TT-NEG" refers to a travel time measure, and, and DIST-NEG refers to a distance measure. Equation (8) is below:

$$\frac{\sum_{a \in A} \frac{o(a) - s(a)}{s(a)}}{|A|}$$

Figure 4D:
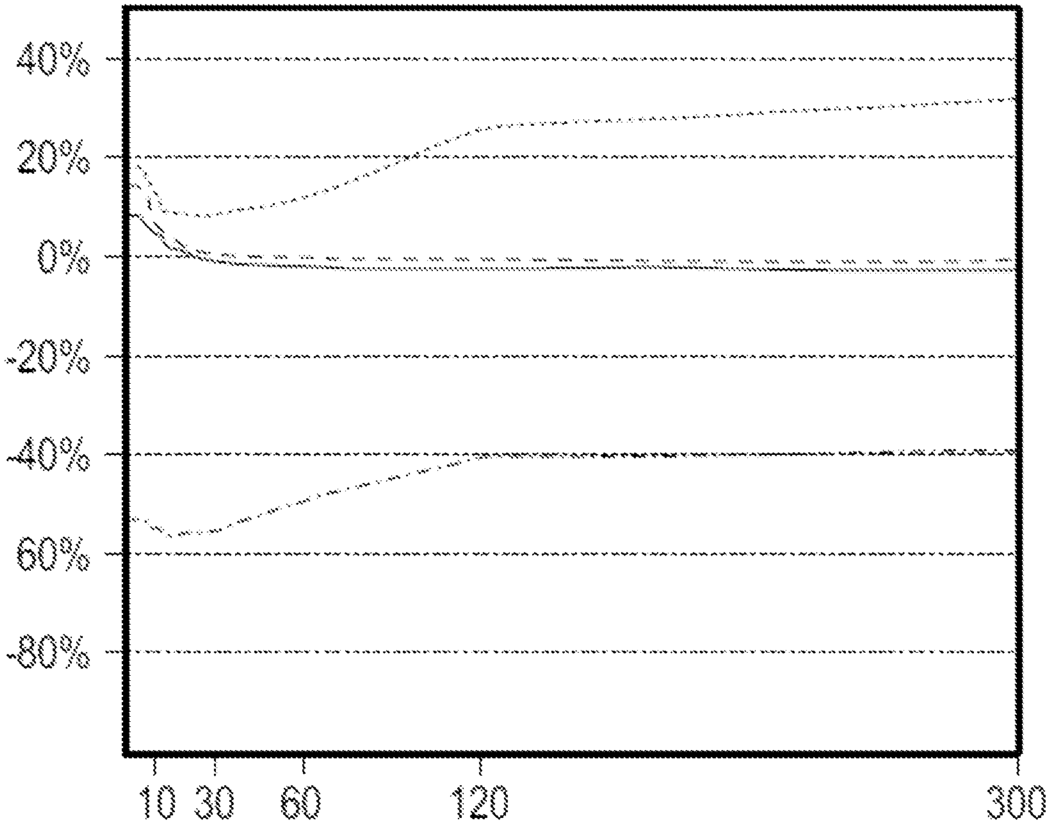
Figure 5B:
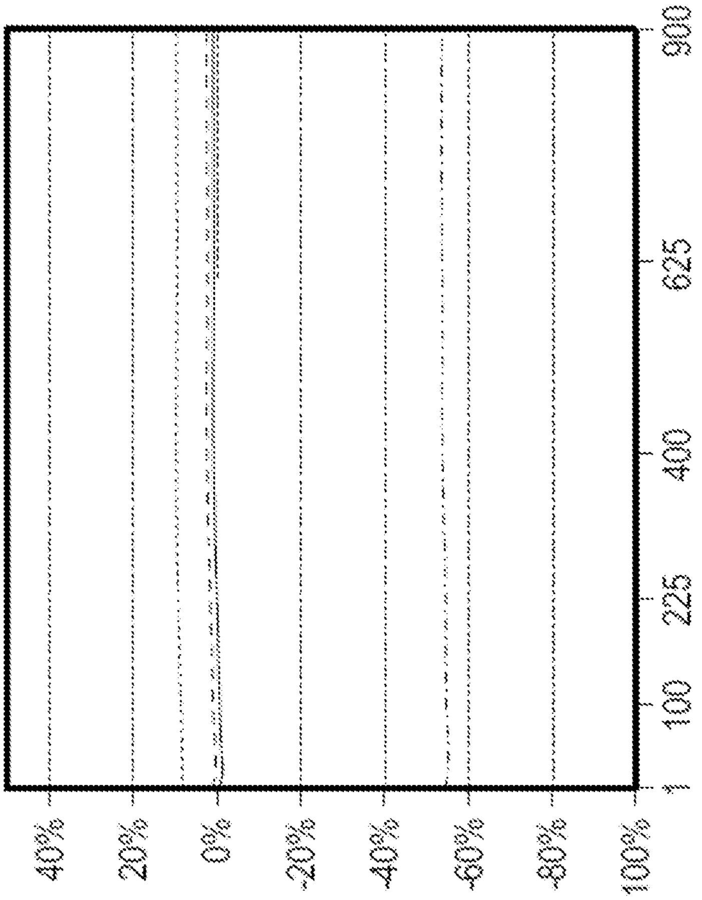
FIG. 5B illustrates results of a batching function arranged by cell counts, according to an embodiment of the present disclosure.
Figure 5A:
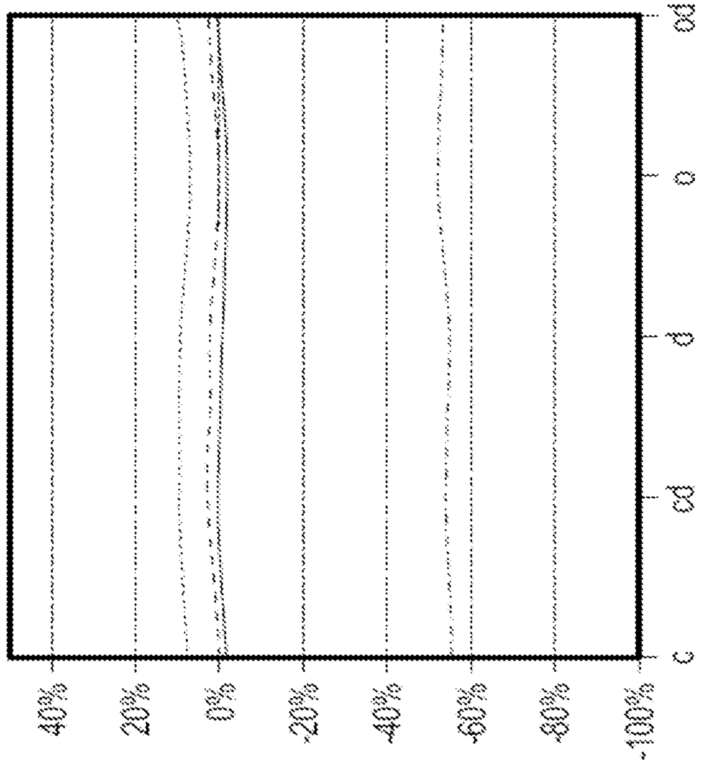
FIG. 5A illustrates performance results of batching functions arranged by type of function, according to an embodiment of the present disclosure.

The simulated system and algorithms were evaluated using a Dell Optiplex 790 desktop computer, with quad-core i7 processors, 16 GB of RAM, a 7200 rpm 500 GB hard drive, and 8M L3 cache, running Ubuntu 16.04.3. MATSim 12.0 was run in standard queue simulation mode using the QSim network engine, with all algorithmic extensions to MATSim implemented in Scala by the authors. This configuration of hardware and software is intended only as a non-limiting example of a computer, and additional computer structure is described herein with reference to FIG. 11. The use of alternative data collection techniques and control systems is contemplated. Additionally, the computer structure shown in FIG. 11 may be used as all or part of a system for transmitting/receiving routing instructions. In the example software simulation described herein, no community extensions to the software were used for modeling traffic lights, turn costs, economics, or vehicle energy. Seven trials were run and averaged to generate each reported data point, and are presented with error bars representing the first standard deviation of the result values. The complete list of parameter values explored is shown in FIGS. 5A-5B. In FIG. 4A, it can be seen that the algorithm shows improved performance as the network load increases. There is also a clear trade-off seen in the amount of agents burdened with increased travel times in order to shift the overall population. Distances, however, remain unaffected. To better put in these effects in context, the average speeds per population size is shown in FIG. 4B In FIG. 4C, the impact of algorithm adoption is shown. In this setting (and using the default parameters from FIG. 8), it appears that any amount of SO adoption can yield significant average travel time reduction in the network. The travel time reduction plateaus at 60% adoption. The negatively-impacted population shows very little increase in travel time below 40% adoption, but can also grow to exceed 10% above 60% adoption. Average trip distances for all agents can be slightly negative until it begins increasing as adoption rate exceeds 80%. This suggests that, above 70% adoption, the algorithm may see diminishing returns, and that an ideal adoption rate for the embodiment described with reference to this example may be in the area of 50%. In FIG. 4D, the effect of batch window duration is demonstrated. Both exceedingly short (less than 15 seconds) and exceedingly long (greater than 30 seconds) batch windows appear to under-perform to the 15-30 second range. Short windows can contribute to queue instability, and, long windows can deaden the algorithm's sensitivity to fluctuations in the network supply. Again, the experimental results described herein are intended only as non-limiting examples of system parameters. The use of different parameters is contemplated by the present disclosure.

The batching function under study has two measures, the batching function type and cell count. The batching function can select the point of origin "o", destination "d", current location "c", combined current/destination points "cd" and combined origin/destination points "od", and is shown in FIG. 5A. Of these, very little difference is observed, but current location is found to have the highest performance of 55% reduction, whereas organizing by origin also shows a value close to 55% reduction, but slightly less. In all cases, this disclosure includes a hypothesis that spatial groupings lack the specificity to effectively improve outcomes. Exploring graph-space groupings and learned latent grouping spaces therefore is a subject of future work. In the embodiment that is the subject of the experimental section, the cell count (shown in FIG. 5B) can have little effect on the algorithm. The algorithm can be robust to problem decomposition which makes it suitable for parallel computation, another subject of future work.

The results described herein with reference to the disclosed example embodiment applied to a moderate-sized road network, show that embodiments described herein have the capability to reduce travel times on average by 59% from a scenario where all agents receive selfish route plans. A SO objective as the assumed route planning algorithm produces a radically different network state than traditional methods. For this reason, some studies of the expected economic and environmental impacts of CAV adoption should be revisited with this approach.

The potential of parallel execution is a side-effect of a good batch grouping algorithm. The work of a parallel implementation, along with a study of more effective groupings, could provide additional performance enhancement, as well as allow for studies over much larger input sizes. The relationship between batch groupings and outcomes contain patterns which can be learned. For example, the average observed network speed in a link-based grouping may be a predictor of the probability of a successful optimal assignment search. Training an effective learning algorithm to identify more promising leads can make the solution more efficient.

Example 2

A non-limiting example of an embodiment of the present disclosure is described below. To review the performance of an embodiment of the present disclosure including dynamic within-trip replanning. An experimental study was developed of three real road networks using synthetic demand. In over 200 trials, embodiments of the present disclosure demonstrate the effects of replanning. Overall network travel times can be reduced by up to 48.49% from a baseline where all drivers are assigned a single route, demonstrating the profound effect of dynamic within-trip replanning. Embodiments of the present disclosure can be used as part of a system-optimal route planning strategy that is robust to network size and conditions.

Let G represent a road network, as a directed, fully-connected, finite graph with vertices V(G) and edges E(G) $\subseteq V(G)\times V(G)$. Each vertex $v\in V(G)$ represents an intersection on a road network map. Each edge $e=(u, v)\ \forall e\in E(G)$ represents a road segment traversing the road network between two vertices $u, v\in V(G)$. Each edge can have a positively-valued and monotonically increasing edge cost/flow function C(x).

Let t be a time in the range $[t_0, T]$, where $t_0$ and T mark the start and end of the simulation, respectively. The time t is a point along a sequence of times with a uniform step size set by the batch window parameter, denoted b. Let Rt be a finite batch of requests at time t, where each request $r\in R_t$ captures the state of some driver at time t along a route between an origin O(r) and destination D(r), where O(r), $D(r)\in V(G)$. The number of agents in batch $R_t$ is a factor of the overall adoption rate a of the replanning algorithm. This driver agent may be recently departing or somewhere along their trip, and may have already received a route plan at some previous time. Each request r is assigned a path $p_r$, which is a vector of the form $<v_0, v_1, \ldots, v_{n-1}, v_n>$, where $v_0=O(r)$, $v_n=D(r)$, $(vk, v_{k+1})\in E(G)\ \forall 0\leq k<n$, and $n>0$. A solution to this problem can find a path $r_p$ using Dijkstra's Algorithm, with the current road network conditions denoted $G_t$, and with edge costs C evaluated using the Bureau of Public Roads cost/flow function as shown in Equation 8, where q is the road segment capacity per hour and f is the free-flow speed per hour for this edge.

$$C(x) = \frac{fb}{3600}\left(1 + .15 * \frac{x}{\frac{qb}{3600}}\right)^4 \quad \text{Eq. 8}$$

$$TT^* = \frac{\sum_{a\in A}\frac{o(a)-s(a)}{s(a)}}{|A|} \quad \text{Eq. 9}$$

FIG. 13 shows the symbols and definitions used throughout this example. A set of 228 randomized trials were run using the open-source traffic simulator MATSim as an evaluation platform. MATSim is a highly-extensible, open-source mesoscopic traffic simulation framework. Mesoscopic traffic simulation represents the traffic flows in a queue simulation, which is fine-grained enough to capture route plans for individual agents and the wave propagation of congestion effects.

Figure 16:
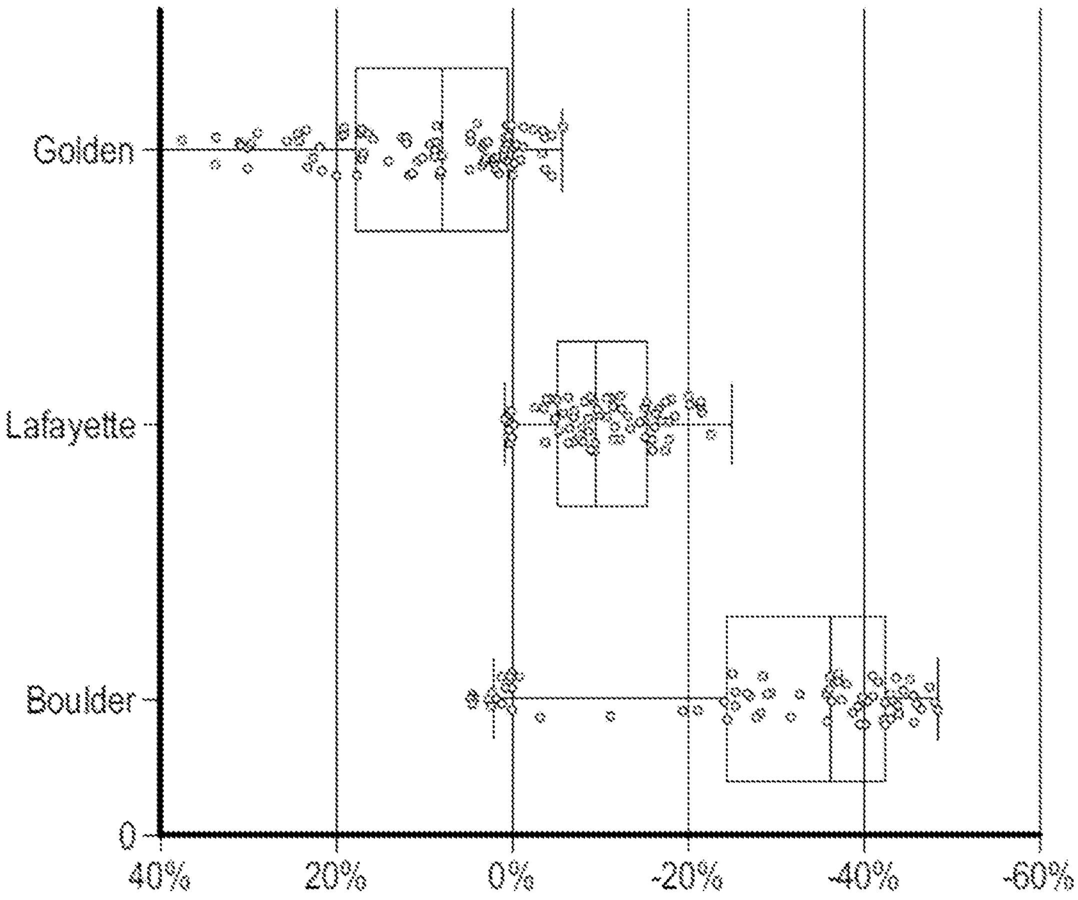
FIG. 16 shows a chart of experimental results representing travel time differences (TT*) for different trials, according to an embodiment of the present disclosure.

Three road networks of different sizes were collected from Open StreetMap, a crowd-sourced data repository of map data. The resulting road networks are shown in FIG. 16 and their attributes summarized in FIG. 14. Each road network was cleaned and modified for MATSim using the OSMnx Python library as well as a built-in MATSim OsmNetworkReader tool for parsing OSMnetworks. The networks were downloaded in two phases. All "drive" network links within the city boundary are downloaded in one phase. In another phase, the city boundary is extended by 1 kilometer and only primary, secondary, and trunk links are downloaded. The two networks are then combined, dismissing redundant overlapping links. This process can prevent creating road networks with unwanted boundary flow behaviors. The final network can be encoded in the Web Mercator coordinate system (EPSG:3857), which approximates a meter unit distance and is acceptable for modeling in MATSim. MATSim can be used as-is, without activating any external modules, such as left turn delays and traffic signals. Uniformly random demand was chosen to help test the robustness of the algorithm to arbitrary loads. Activity locations were randomly sampled from the road network links, and work departure times were also uniformly sampled in the range [8:30 am, 9:30 am] with an 8-hour work activity, to approximate a demand curve with peaks during morning and evening commutes. Population sizes were randomly sampled for each scenario in a range which creates low to high congestion effects. In each random experiment, two simulations can be run, with and without replanning. For both simulations, a random road network is selected. A synthetic population of a random size is generated which is shared by both simulations. The size is chosen to fit within a range which we observe to produce reasonable congestion effects under baseline conditions, which we quantify as between a 1-3× increase in travel times from those experienced in a network with free flow speeds (no congestion). In the replanning simulation, a random adoption rate $a \in [0, 1]$ and batch window $b \in [5, 600]$ are selected.

To measure the performance of a configuration, the travel times with replanning were compared on an agent-by-agent basis between the result without replanning. The average travel time difference TT* is calculated, as shown in Equation 9, where $\alpha$ is a driver agent sampled from the entire population A, $w(\alpha)$ is the observation without replanning, and $r(\alpha)$ is the result with replanning. When reviewing results showing TT*, lower scores show greater improvement to travel time.

MATSim 12.0 was run in standard queue simulation mode using the QSim network engine, with all algorithmic extensions to MATSim implemented in Scala. Across the set of experimental trials of this embodiment of the present disclosure, a trend emerges that shows travel time improvement with increased adoption a and smaller batch windows b for trials set in Lafayette and Boulder. However, the opposite is observed with the smaller road network of Golden. Embodiments of the present disclosure can include boundary conditions where route plans in constrained networks may produce trips which oscillate under replanning. In order to address this, a coordinated route planning objective can be required, such as a system-optimal route planning approached.

Figure 17:
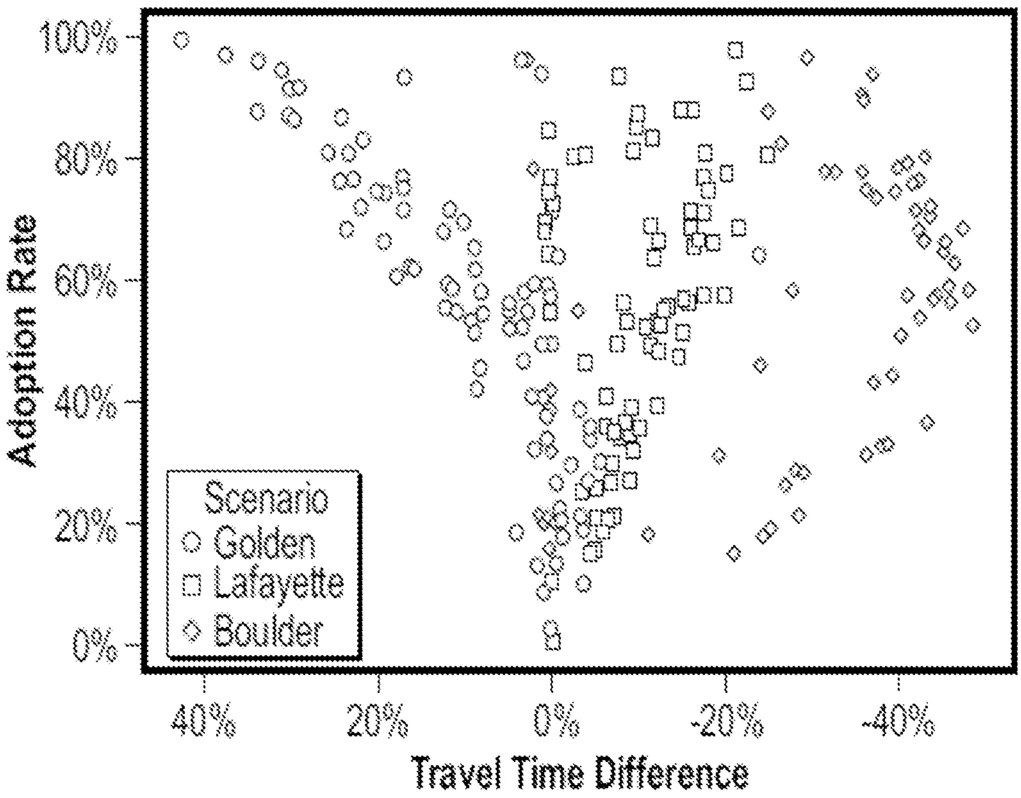
FIG. 17 shows a chart of experimental results representing travel time differences (TT*) versus adoption rate for different trials, according to an embodiment of the present disclosure.
Figure 18:
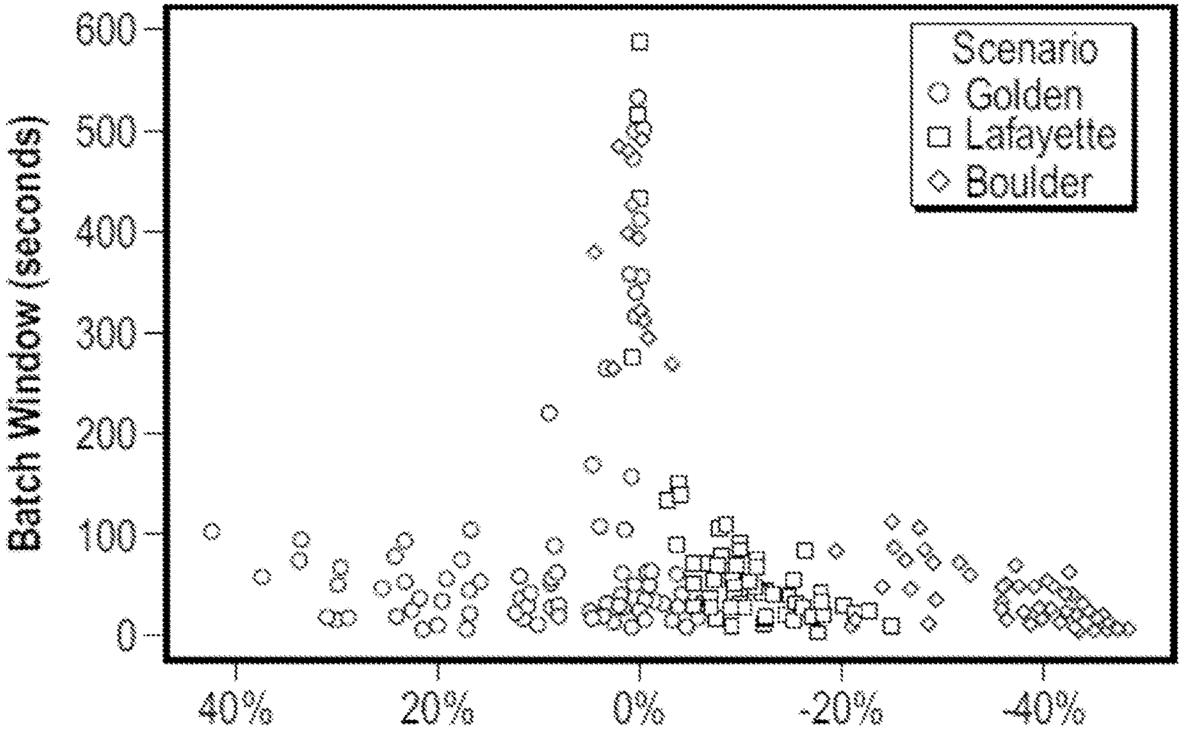
FIG. 18 shows a chart of experimental results representing travel time differences (TT*) versus batch window lengths in seconds for different trials, according to an embodiment of the present disclosure.

In FIG. 16, the TT* values for experiments are shown for each road network. The results are summarized in FIG. 15. Golden is the smallest network, and does not show TT* improvement on average. Alternatively, the worst-performing trials for both Lafayette and Boulder do not result in as dramatically increased travel times. The Lafayette network, which is slightly larger than Golden, shows an average TT* of −10.03%, and in Boulder, this is extended to 29.84%. In the following figures these effects can be a function of the adoption rate a and batch window b parameters. The adoption rate a, as shown in FIG. 17, shows that a majority adoption of route replanning can create the most pronounced effect. There is also evidence that event low amounts of adoption, such as 10-20%, can lead to improved travel times in larger road networks. This is useful, as it fits the scenario where an organized business fleet or mobility-as-a-service (MaaS) provider may be suited to uniformly adopt algorithmic route planning strategies. In FIG. 18 the batch window b is shown.

For some scenarios, batch windows greater than roughly 2 minutes can result in a TT* of 0%. In some embodiments of the present disclosure, as the rate of updates slow, the assigned routes are persisted longer, leading to decaying optimality in the route plans. For some embodiments of the present disclosure, $b<30$ shows the greatest result, implying a real-time route replanning algorithm should aim to make decisions in an under-minute time frames. Replanning at this frequency has not yet been explored by mapping applications in the real world and may not be suitable for human-driven vehicles, but it could become a promising area of research for the planning of autonomous vehicle routing. The effect of replanning can be a net positive for network congestion, improving the average travel time, but it can create problems under certain conditions, such as a small and congested network with limited route alternatives. The results of this experiment with one embodiment of the present disclosure do show a moderate-sized road network has the capability to reduce travel times of 48.49% compared to a traditional single route assignment.

Example 3

A non-limiting example of an embodiment of the present disclosure is described below. To review the performance of an embodiment of the present disclosure including computation of ranked sub-batches of drivers within an SO batch was evaluated. Routing requests within a batch can have temporal locality, but can be dispersed across the directed graph of a road network. The requests can be grouped into sub-batches by using a road network trajectory clustering technique, which also integrates network congestion effects and graph structure. Since this can create more route planning batches to solve, a subset of candidate sub-batches can be created using a ranking technique. As a result of introducing replanning and sub-batching, the SO route planning technique can be scaled to larger road networks. Experimental study shows that replanning for user-optimal agents brings much benefit over fixed route plans, showing travel time improvement up to 48.49%. When coupled with a SO route planning objective, replanning can be improved up to 60.96%.

Embodiments of the present disclosure can include alternative formulations of the system-optimal route planning problem. Let G represent a road network, as a directed, fully-connected, finite graph with vertices V(G) and edges $E(G) \subseteq V(G) \times V(G)$. Each vertex $v \in V(G)$ represents an intersection on a road network map. Each edge $e=(u, v)\ \forall e \in E(G)$ represents a road segment traversing the road network between two vertices $u, v \in V(G)$. Each edge has a positively-valued and monotonically increasing link cost/flow function C(x) which can be nonlinear.

Let R be a finite batch of requests, where each request $r \in R$ captures the intent of some driver at time T(r) to seek point-to-point routing from an origin O(r) to a destination D(r), where $O(r), D(r) \in V(G)$. For each request r, there exists a set of paths Pr, which may be empty. Each path $p \in P_r$ is a vector of the form $<v_0, v_1, \ldots, v_{n-1}, v_n>$, where $v_0=O(r)$, $v_n=D(r)$, $(v_k, v_{k+1})$ E(G) $\forall 0 k \leq n$, and $n>0$.

An SO route plan at time t with batch window b and alternative path limit k can be a solution to the following assignment problem. A matrix X with size $|R_t|$ by k is constructed, where $x_{ij}=1$ assigns path $p_j$ to request $r_i$. Each request in $R_t$ has a time stamp T(r) which falls within the range [t, t+b), referred to as the batch window.

The algorithm seeks to select an assignment to the matrix X which minimizes the cost-flows on each edge in the road network in Equation 1b. Across all selected paths, the number of occurrences of each edge is counted in Equation 2b. The assignment matrix X has size Rt by k, where k is the maximum number of path alternatives per driver for the request batch Rt. The matrix X must have exactly one path selected for each request as shown in Equations 5 & 6.

At time t+1, requests Rt+1 may correspond with agents which have previously received route plans, and so solutions to their request are denoted as a replanning. The complete set of definitions is listed in FIG. 19.

Equations 1-6 are illustrated in FIG. 12 and made reference to in this example embodiment of the present disclosure. The assignment can be a multi choice knapsack problem with a time complexity of O(P*|Rt||E(G)|) where $P^* = \max_{r \in Rt} |P_r|$ is the maximum set of paths for all requests at time t, and each path is O(|E(G)|). In addition, while the problem is convex, the elements in this problem have dependent values, as the cost of an edge differs by the number of paths which will use it, which makes it difficult to express as a typical integer linear programming problem. For example, a binary assignment vector of edges for each request could be constructed with $R_t \times E(G)$ edges. This still does not correctly represent the accumulative effect of multiple requests traversing the same edge; i.e., C(1)+C(1) ≠C(2), as cost/flows are nonlinear. To model this sort of problem one must account for the uncertainty in the search space due to these dependent values. An approximate solution can be adopted here in order to demonstrate embodiments of the present disclosure including SO assignment in real-world scenarios. Approximation can be considered sufficient; regardless of the time spent searching, embodiments of the present disclosure can include the fallback of choosing the user-optimal route as a solution for each agent. Even the slightest improvement to the average travel time can be a meaningful result. However, approximation is tractable when the problem space can be reasonably investigated under a real-time computation budget. This technique can depend on successful modeling of the current road network state.

One approximation technique is as follows. For all requests, a set of k alternative paths is computed using Eppstein's Algorithm, which provides each request with up to k near-optimal path alter-natives, including the original shortest path. Next, a dynamic programming technique based on Monte Carlo Tree Search searches for a path assignment for the batch $R_t$ which minimizes cost/flows. This algorithm runs until a real-time compute budget is exhausted, which is equal to the batch window duration b. At completion, the paths associated with the minimal cost combination are assigned to each request.

A method to divide-and-conquer the request batch $R_t$ into sub-batches can be performed as a two-phase operation, where requests are first grouped into sub-batches, and then sub-batches are filtered to remove candidate sub-batches which are deemed less likely to improve network state.

Grouping can leverage information about the similarity of requests, while filtering can leverage estimations on the potential of a sub-batch to benefit from SO assignment. Each sub-batch then becomes the input to an independent SO route assignment, and is solved using the technique described above. In place of Eppstein's k-shortest paths algorithm used in some embodiments, the single-via paths variant of the k-shortest paths with limited overlap (kspwlo) technique can be used, which allows fast computation of a spatially-diverse set of alternative paths. An assumption can be used that assumes that all paths can be pre-computed for a solution, given that the routes are generated using only static network attributes. For this reason, the path search is not included in the compute budget. Each sub-batch of requests with route alternatives is treated as a multi-choice knapsack problem to be solved via optimization, where the minimal-cost combination selects the route plans to assign to each request.

Figure 20:
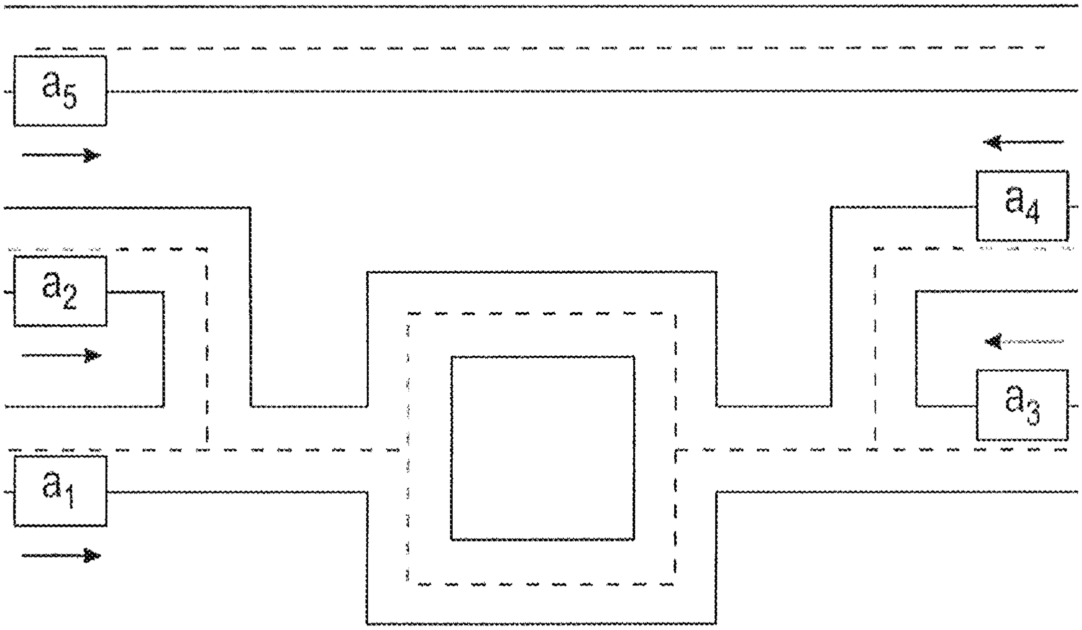
FIG. 20 illustrates an initial state of an example network including five agents, according to an embodiment of the present disclosure.

As a running example for this solution, consider a batch of 5 agents as shown in FIG. 20. Agents $a_1$, $a_2$, and $a_5$ have a destination to the east, while agents $a_3$ and $a_4$ are headed to the west. While it is possible to combine these into a single batch, it is plain to see that agents $a_1$ and $a_2$ will likely not share route plans with agents $a_3$ and $a_4$, and agent as will not encounter any other agents. Therefore, this problem can be simplified into three disjoint routing sub-batches: $a_1$ and $a_2$, $a_3$ and $a_4$, and $a_5$. Since the batch containing $a_5$ is a singleton, it can only have a user-optimal route, and so it can be dismissed. This leaves two final sub-batches, both with size $2^2$, where each sub-batch contains 2 agents, each with 2 path alternatives. In the following sections, the proposed sub-batch grouping and filtering technique are described.

A. Sub-Batch Grouping

In this example, the grouping of requests can be modeled as a trajectory clustering problem. At time t, a known trajectory of each request is assumed. The trajectory is a sequence of recently-traversed edges in the road network, denoted $T_r = \langle e_0, e_1, \ldots, e_{\tau-1}, e_\tau \rangle$, $0 <= \tau < E(G)$ for each request $r \in R_t$. The choice of τ is a user-provided parameter which restricts the number of recent links to consider in each trajectory.

Using the set of trajectories, clustering is performed using the LBTC (Label-based trajectory clustering) method. As LBTC is a vertex-oriented graph algorithm, the road network is first transformed into a pseudograph dual representation, where graph dual vertices represent road network links, connected by simple edges where traversal is permitted. LBTC produces a clustering of the road network based on two similarity measures. The attribute similarity observes the trajectory flows and the speeds of each link. The structural similarity is the cosine similarity of the graph dual vertices, as shown in Equation 7b, where π(v) is the set of neighbors to graph dual vertex v.

$$SS(v_i, v_j) = \frac{|\pi(vi) \cap (vj)|}{|\pi(vi)||(vj)|} \quad \text{Equation 7b}$$

The convergence of LBTC in this online setting is measured by calculating the Davies-Bouldin (DB) index at each iteration. The algorithm halts when values are no longer decreasing, or if the overall time budget is reached. Requests are then assigned a label 1 using the label applied to the edge corresponding to the request's location. This forms sub-batches of requests with matching edge labels, denoted $R_l^t$.

Figure 21:
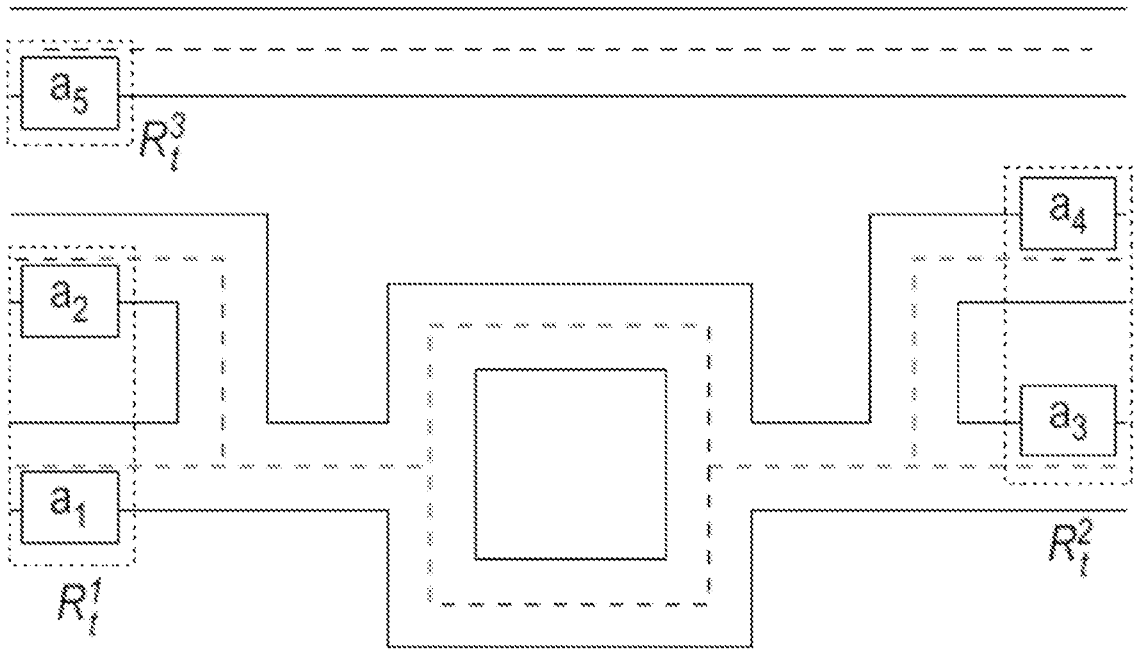
FIG. 21 illustrates an example network including sub-batches, according to an embodiment of the present disclosure.

Building sub-batches using trajectory clustering results in request groupings which have common locality, orientation, and are under similar network conditions. These are strong indicators of having competition in their alternate path spaces. Therefore, trajectory-based sub-batching is an intuitive heuristic for the pruning of the overall search space for $R_t$. As shown in FIG. 21, three sub-batches are selected based on clustering their trajectories. Agents $a_1$ and $a_2$ are assigned a common label, a3 and a4 similarly, while a5 is a singleton sub-batch. Tests were executed with a coordinate-based grouping heuristic, but these can result in poor performance of the system-optimal route planning technique. While coordinate-based groupings are a more intuitive baseline technique for grouping, it can be hypothesized that the lack of network information in the heuristic led to poor quality matching.

B. Sub-Batch Filtering

While grouping agents into sub-batches effectively prunes the search by reducing the size of each batch, it increases the number of times the SO assignment must run, which may quickly overwhelm the available compute resource, particularly given real-time route planning constraints. In this work, it is assumed that, for online execution, the overall set of sub-batches should be reduced to exactly fit a compute budget, using the time remaining in the batch window, minus the time spent running the trajectory clustering algorithm. Since there may not be sufficient time to run assignment for all sub-batches, a heuristic is used to rank sub-batches, and a top-$b_k$ set of sub-batches is passed to the assignment algorithm, which is hereby referred to as sub-batch filtering.

A suitable ranking must identify which sub-batches have a greater chance of improving network congestion via SO assignment. An intuitive metric to identify these candidates can be found by comparing the user-optimal routes available to each request in a batch. The proposed ranking measure is generated based on first calculating a shortest path Dijkstra (r) for the remaining trip of each request in $R^l_t$, computed offline using static network attributes. For each request $r \in R^l_t$, for each edge in Dijkstra(r), the cost C(e) is recorded if at least one other request in $R^l_t$, shares that edge. The total costs are summed over the group. The process for computing this agent-proportional overlap sum ranking is shown in FIG. 22.

The sub-batches are sorted descending using this ranking function, and only the top $b_k$ are persisted to the final assignment algorithm, where $b_k$ is a user-provided parameter. Assuming sequential computation, the entire remaining compute budget must be subdivided so that each $b_k$ sub-batch can be permitted a budget for assignment search. In this work, the remaining compute budget is divided evenly by the number $b_k$, assuming no parallelism. For example, if the remaining compute budget is 10 seconds, and $b_k=5$, then each sub-batch will have a budget of 2 seconds.

Figure 23:
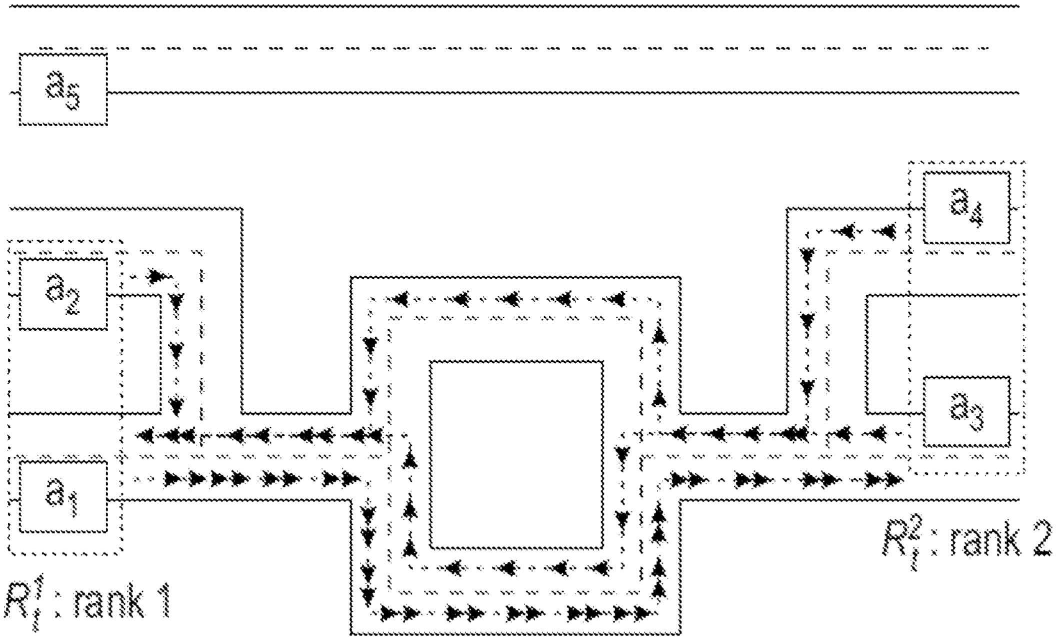
FIG. 23 illustrates an example of a running network including ranked sub-batches using filter threshold $b_k=2$

As shown in FIG. 23, the labeled groups are ranked by their overlap, and filtered to the user-provided value of $b_k$, which in this case is 2. Batches $R_t^1$ and $R_t^2$ would be persisted, with $R_t^1$ holding a higher rank due to greater overlap. Batch $R_t^3$ would be removed, as only the top $b_k=2$ sub-batches are accepted.

Figure 25:
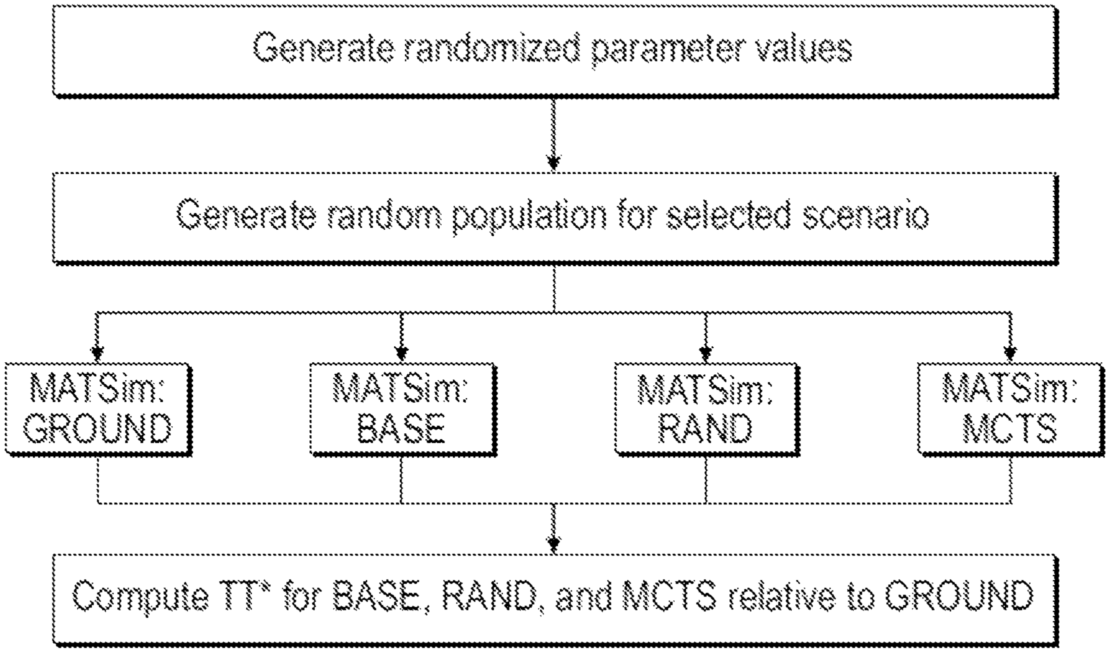
FIG. 25 illustrates an example method for testing embodiments of the present disclosure using traffic simulation software.

An embodiment of the present disclosure incorporating a system optimal technique was tested in a set of 237 randomized trials using MATSim, an open-source traffic simulator. In each experiment, agents are assigned either a user-optimal or one of three system-optimal route planning algorithms, based on sampling from the adoption rate parameter a. Four simulations are then run, where the first is a simulation with all agents receiving a user-optimal route plan with no replanning (denoted GROUND). Once completed, three variants of a system-optimal algorithm are then run as independent simulations but using the same road network, population file, and experimental parameters. The first variant, denoted BASE, is a baseline algorithm which will replan SO agents within-trip using user-optimal routing. This differs from GROUND in that it includes replanning. The next variant will use the proposed within-trip batch replanning algorithm, but solving assignment via a random sampling approach, denoted RAND. Finally, a SO replanning algorithm which solves assignment using Monte Carlo Tree Search (denoted MCTS) is run. This uses a modified version of MCTS designed for combinatorial search in the same way as described with respect to other embodiments of the present disclosure. The complete process is illustrated in FIG. 25. To measure the performance of a configuration, the travel times were compared on an agent-by-agent basis between the GROUND result and one of the test algorithms. The average travel time difference TT* is calculated, as shown in Equation 9 (from the previous example, above), where α is a driver agent sampled from the entire population A, s(α) is the GROUND observation, and o(α) is the test algorithm observation (one of BASE, RAND, or MCTS). When reviewing results showing TT*, lower scores show greater improvement to travel time.

Figure 24A:
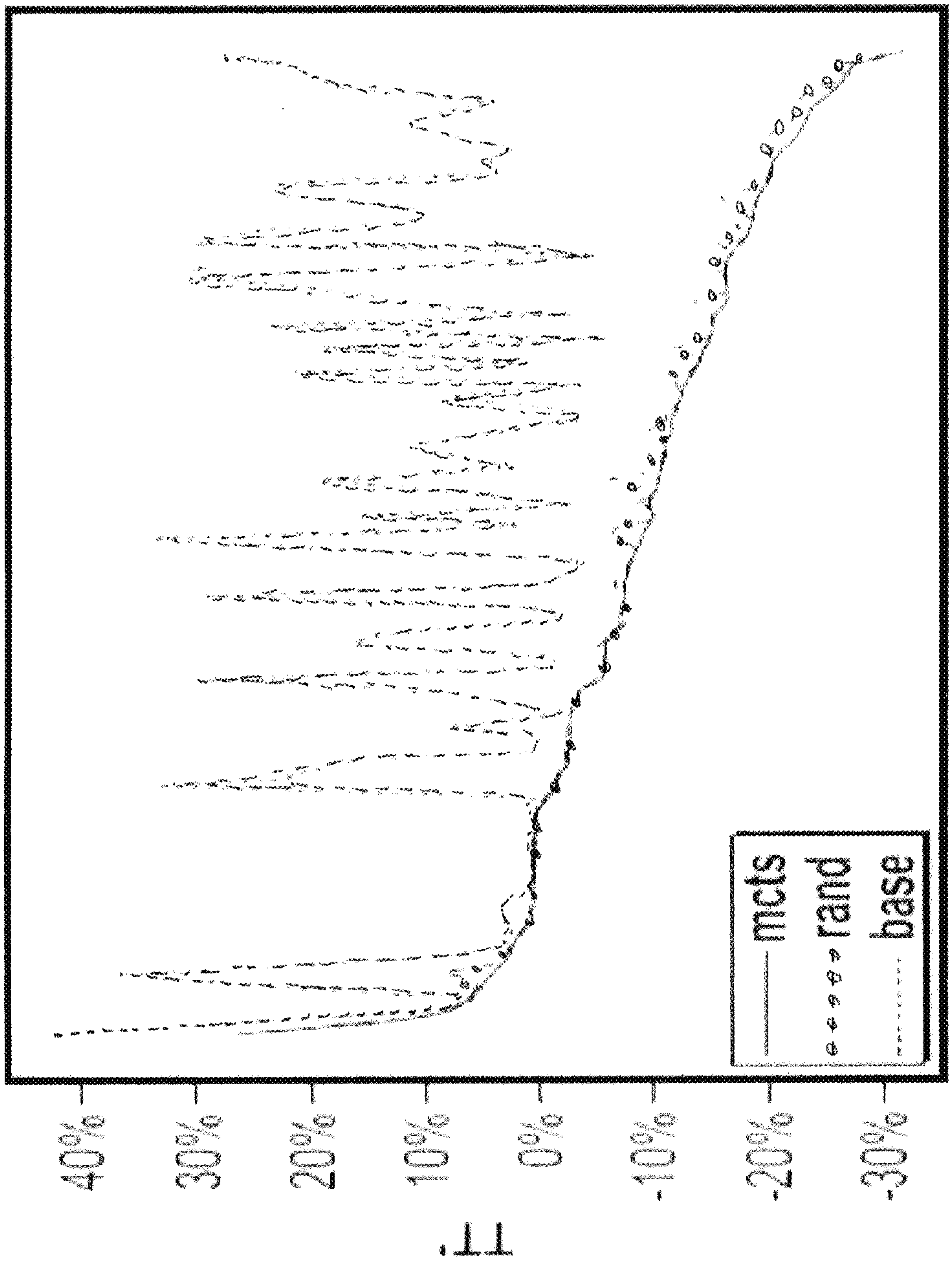
FIGS. 24A-24C illustrate experimental results representing travel time differences (TT*) for a non-limiting example embodiment.
Figure 24B:
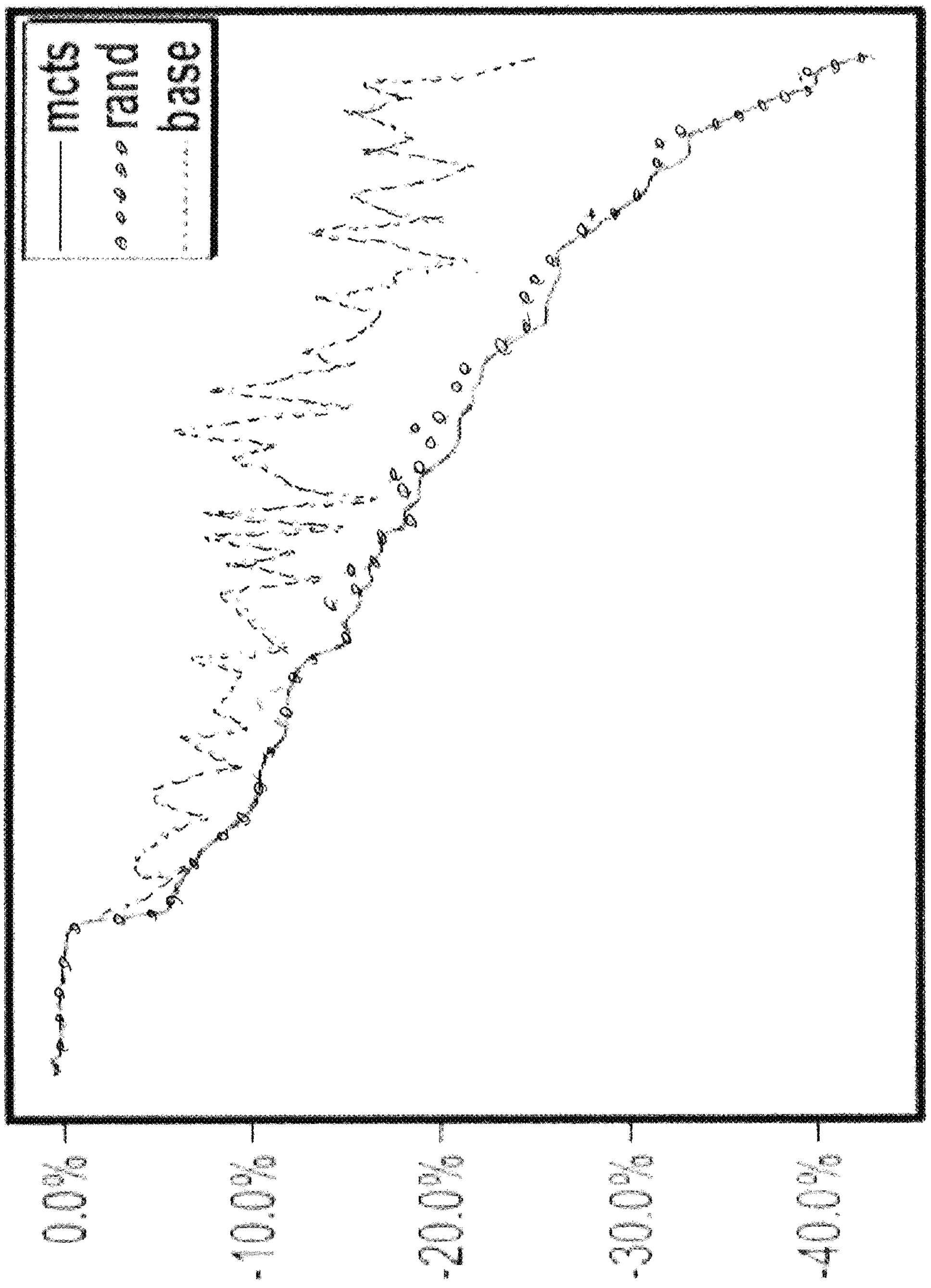
Figure 24C:
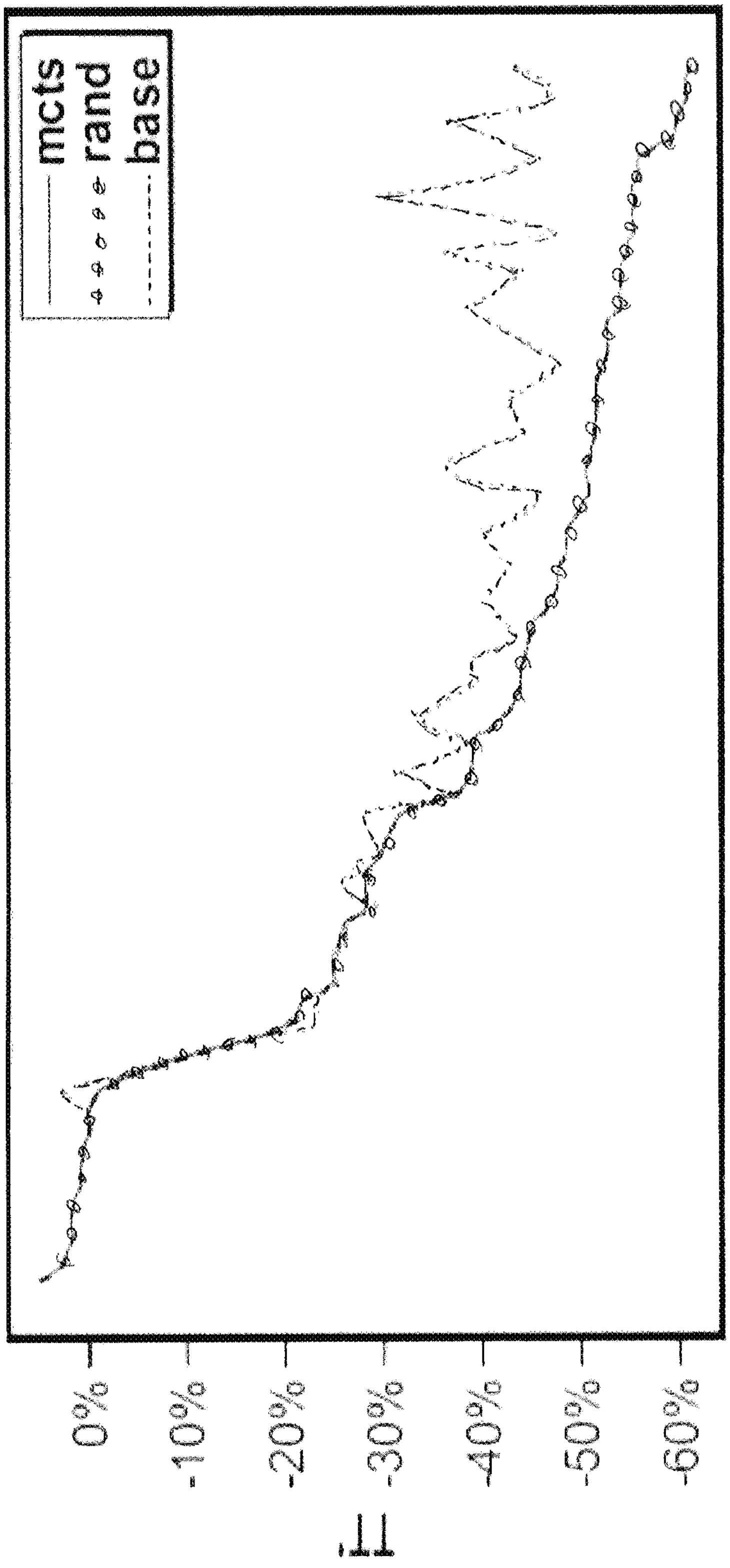

In FIGS. 24A-24C, the TT* values for experiment 3 are shown, for each road network and each SO algorithm under study, with values sorted by the TT* of the MCTS experiment in each trial. The average result for each is shown in FIG. 26. Across different scenarios, an SO route planning algorithm can significantly improve over user-optimal route planning, and in some embodiments of the present disclosure the improvement can be in all scenarios. While the result for RAND and MCTS can be highly correlated, the BASE result trends toward higher mean and variance. This can indicate an improvement of network reliability under an SO route planning algorithm. While MCTS appears to dominate over RAND across all scenarios, the magnitude of the difference is small, and depreciates as network sizes increase.

Figure 11:
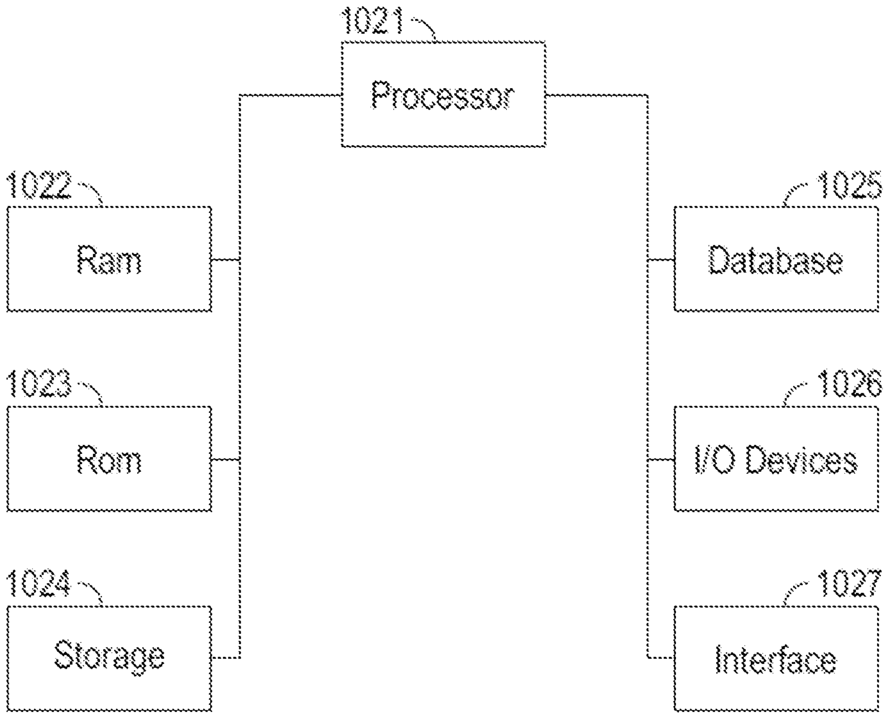
FIG. 11 illustrates an exemplary computer that may comprise all or a portion of the system for performing system optimal routing; conversely, any portion or portions of the computer illustrated in FIG. 11 may comprise all or a portion of the system for performing system optimal routing; conversely.

FIG. 11 illustrates an exemplary computer that may comprise all or a portion of a system for generating printability maps for additive manufacturing. Conversely, any portion or portions of the computer illustrated in FIG. 11 may comprise all or part of the system performing system optimal routing. As used herein, "computer" may include a plurality of computers. The computers may include one or more hardware components such as, for example, a processor 1021, a random-access memory (RAM) module 1022, a read-only memory (ROM) module 1023, a storage 1024, a database 1025, one or more input/output (I/O) devices 1026, and an interface 1027. Alternatively, and/or additionally, the computer may include one or more software components such as, for example, a computer-readable medium including computer executable instructions for performing a method associated with the exemplary embodiments such as, for example, an algorithm for determining a property profile gradient. It is contemplated that one or more of the hardware components listed above may be implemented using software. For example, storage 1024 may include a software partition associated with one or more other hardware components. It is understood that the components listed above are exemplary only and not intended to be limiting.

Processor 1021 may include one or more processors, each configured to execute instructions and process data to perform one or more functions associated with a computer for controlling a system (e.g., a system for generating printability maps for additive manufacturing) and/or receiving and/or processing and/or transmitting data associated with electrical sensors. Processor 1021 may be communicatively coupled to RAM 1022, ROM 1023, storage 1024, database 1025, I/O devices 1026, and interface 1027. Processor 1021 may be configured to execute sequences of computer program instructions to perform various processes. The computer program instructions may be loaded into RAM 1022 for execution by processor 1021.

RAM 1022 and ROM 1023 may each include one or more devices for storing information associated with operation of processor 1021. For example, ROM 1023 may include a memory device configured to access and store information associated with the computer, including information for identifying, initializing, and monitoring the operation of one or more components and subsystems. RAM 1022 may include a memory device for storing data associated with one or more operations of processor 1021. For example, ROM 1023 may load instructions into RAM 1022 for execution by processor 1021.

Storage 1024 may include any type of mass storage device configured to store information that processor 1021 may need to perform processes consistent with the disclosed embodiments. For example, storage 1024 may include one or more magnetic and/or optical disk devices, such as hard drives, CD-ROMs, DVD-ROMs, or any other type of mass media device.

Database 1025 may include one or more software and/or hardware components that cooperate to store, organize, sort, filter, and/or arrange data used by the computer and/or processor 1021. For example, database 1025 may store data related to the plurality of thrust coefficients. The database may also contain data and instructions associated with computer-executable instructions for controlling a system (e.g., a system for controlling a fleet of connected autonomous vehicles) and/or receiving and/or processing and/or transmitting data associated with a network of sensor nodes used to measure water quality. It is contemplated that database 1025 may store additional and/or different information than that listed above.

I/O devices 1026 may include one or more components configured to communicate information with a user associated with computer. For example, I/O devices may include a console with an integrated keyboard and mouse to allow a user to maintain a database of digital images, results of the analysis of the digital images, metrics, and the like. I/O devices 1026 may also include a display including a graphical user interface (GUI) for outputting information on a monitor. I/O devices 1026 may also include peripheral devices such as, for example, a printer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1027 may include one or more components configured to transmit and receive data via a communication network, such as the Internet, a local area network, a workstation peer-to-peer network, a direct link network, a wireless network, or any other suitable communication platform. For example, interface 1027 may include one or more modulators, demodulators, multiplexers, demultiplexers, network communication devices, wireless devices, antennas, modems, radios, receivers, transmitters, transceivers, and any other type of device configured to enable data communication via a wired or wireless communication network.

The figures illustrate the architecture, functionality, and operation of possible implementations of systems, methods and computer program products according to various implementations of the present invention. In this regard, each block of a flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be used to implement the systems and methods described hereinabove. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The various embodiments described above are provided by way of illustration only and should not be construed to limit the scope of the present disclosure. Those skilled in the art will readily recognize that various modifications and changes may be made to the present disclosure without following the example embodiments and implementations illustrated and described herein, and without departing from the spirit and scope of the disclosure and claims here appended and those which may be filed in non-provisional patent application(s). Therefore, other modifications or embodiments as may be suggested by the teachings herein are particularly reserved.

LIST OF REFERENCES

[1] Erhardt, G. D., S. Roy, D. Cooper, B. Sana, M. Chen, and J. Castiglione, Do transportation network companies decrease or increase congestion? Science advances, Vol. 5, No. 5, 2019, p. eaau2670.
[2] Thai, J., N. Laurent-Brouty, and A. M. Bayen, Negative externalities of GPS-enabled routing applications: A game theoretical approach. In 2016 IEEE 19th International Conference on Intelligent Transportation Systems (ITSC), IEEE, 2016, pp. 595-601.
[3] Fitzgerald, R. J. and F. Banaei-Kashani, Toward System-Optimal Route Guidance. In 2019 20th IEEE International Conference on Mobile Data Management (MDM), IEEE, 2019, pp. 91-99.
[4] Auld, J. A., F. de Souza, A. Enam, M. Javanmardi, M. Stinson, O. Verbas, and A. Rousseau, Exploring the mobility and energy implications of shared versus private autonomous vehicles. In 2019 IEEE Intelligent Transportation Systems Conference (ITSC), IEEE, 2019, pp. 1691-1696.
[5] Wardrop, J. G., Road paper. some theoretical aspects of road traffic research. Proceedings of the institution of civil engineers, Vol. 1, No. 3, 1952, pp. 325-362.
[6] Mahmassani, H. S. and S. Peeta, Network performance under system optimal and user equilibrium dynamic assignments: implications for ATIS. Transportation Research Board, 1993.
[7] Clements, L. M. and K. M. Kockelman, Economic effects of automated vehicles. Transportation Research Record, Vol. 2606, No. 1, 2017, pp. 106-114.
[8] Childress, S., B. Nichols, B. Charlton, and S. Coe, Using an activity-based model to explore the potential impacts of automated vehicles. Transportation Research Record, Vol. 2493, No. 1, 2015, pp. 99-106.
[9] Geisberger, R., P. Sanders, D. Schultes, and C. Vetter, Exact routing in large road networks using contraction hierarchies. Transportation Science, Vol. 46, No. 3, 2012, pp. 388-404.
[10] Yen, J. Y., An algorithm for finding shortest routes from all source nodes to a given destination in general networks. Quarterly of Applied Mathematics, Vol. 27, No. 4, 1970, pp. 526-530.
[11] Eppstein, D., Finding the k shortest paths. SIAM Journal on computing, Vol. 28, No. 2, 1998, pp. 652-673.
[12] Liu, H., C. Jin, B. Yang, and A. Zhou, Finding top-k shortest paths with diversity. IEEE Transactions on Knowledge and Data Engineering, Vol. 30, No. 3, 2017, pp. 488-502.
[13] Abraham, I., D. Delling, A. V. Goldberg, and R. F. Werneck, Alternative routes in road networks. Journal of Experimental Algorithmics (JEA), Vol. 18, 2013, pp. 1-1.
[14] Chondrogiannis, T., P. Bouros, J. Gamper, U. Leser, and D. B. Blumenthal, Finding k37 shortest paths with limited overlap. The VLDB Journal, 2020, pp. 1-25.
[15] Kriegel, H.-P., M. Renz, and M. Schubert, Route skyline queries: A multi-preference path planning approach. In 2010 IEEE 26th International Conference on Data Engineering (ICDE 2010), IEEE, 2010, pp. 261-272.
[16] McNally, M. G., The four step model. Handbook of transport modelling, Vol. 1, 2007, pp. 35-53.
[17] Fukushima, M., A modified Frank-Wolfe algorithm for solving the traffic assignment problem. Transportation Research Part B: Methodological, Vol. 18, No. 2, 1984, pp. 169-177.
[18] Peeta, S. and A. K. Ziliaskopoulos, Foundations of dynamic traffic assignment: The past, the present and the future. Networks and spatial economics, Vol. 1, No. 3-4, 2001, pp. 233-265.
[19] García-Nieto, J., E. Alba, and A. C. Olivera, Swarm intelligence for traffic light scheduling: Application to real urban areas. Engineering Applications of Artificial Intelligence, Vol. 25, No. 2, 2012, pp. 274-283.
[20] Hu, W., H. Wang, L. Yan, and B. Du, A swarm intelligent method for traffic light scheduling: application to real urban traffic networks. Applied Intelligence, Vol. 44, No. 1, 2016, pp. 208-231.
[21] Gao, K., Y. Zhang, A. Sadollah, A. Lentzakis, and R. Su, Jaya, harmony search and water cycle algorithms for solving large-scale real-life urban traffic light scheduling problem. Swarm and evolutionary computation, Vol. 37, 2017, pp. 58-72.
[22] Mousavi, S. S., M. Schukat, and E. Howley, Traffic light control using deep policy gradient and value-function-based reinforcement learning. IET Intelligent Transport Systems, Vol. 11, No. 7, 2017, pp. 417-423.
[23] Carlino, D., S. D. Boyles, and P. Stone, Auction-based autonomous intersection management. In 16th International IEEE Conference on Intelligent Transportation Systems (ITSC 2013), IEEE, 2013, pp. 529-534.
[24] Censi, A., S. Bolognani, J. G. Zilly, S. S. Mousavi, and E. Frazzoli, Today me, tomorrow thee: Efficient resource allocation in competitive settings using karma games. In 2019 IEEE Intelligent Transportation Systems Conference (ITSC), IEEE, 2019, pp. 686-693.
[25] Wilbaut, C., S. Hanafi, and S. Salhi, A survey of effective heuristics and their application to a variety of knapsack problems. IMA Journal of Management Mathematics, Vol. 19, No. 3, 2008, pp. 227-244.
[26] Pedroso, J. P. and R. Rei, Tree Search and Simulation. In Applied Simulation and Optimization, Springer, 2015, pp. 109-131.
[27] Traffic assignment manual. US Department of Commerce, Washington, D C, 1964.
[28] Horni, A., K. Nagel, and K. W. Axhausen, The multi-agent transport simulation MATSim. Ubiquity Press London: 2016.
[29] OpenStreetMap contributors, Planet dump retrieved from https://planet.osm.org. https://www.openstreetmap.org, 2018.
[30] Boeing, G., OSMnx: New methods for acquiring, constructing, analyzing, and visualizing complex street networks. Computers, Environment and Urban Systems, Vol. 65, 2017, pp. 126-139.

The invention claimed is:

1. A computer implemented method for providing system-optimal traffic routing instructions, the method using a computer processor to implement steps comprising:

obtaining a current state of a traffic network;

determining a set of active agents in the traffic network that are configured to request and receive a system optimal route, wherein each of the active agents corresponds to a vehicle of a set of vehicles in the traffic network;

applying a batching function to the set of vehicles implementing a route-finding algorithm to create a batch of vehicles for route replanning;

creating, from the batch of vehicles for route replanning, sub-batches based on a spatial relationship between the vehicles and temporal relationships between the vehicles, wherein the spatial relationship between the vehicles predicts whether the vehicles intersect spatially, and wherein the temporal relationship between the vehicles predicts whether the vehicles will intersect temporally;

ranking the sub-batches according to a respective likelihood that each sub-batch will improve network congestion with the system optimal route;

setting a parameter that establishes a number of highest ranked sub-batches to continue with the route replanning;

for the number of the highest ranked sub-batches, generating a plurality of alternative paths for each of the highest ranked sub-batches, wherein the plurality of alternative paths are identified using a tree search configured to limit a spatial overlap of the alternative paths;

generating a batch assignment for each of the highest ranked sub-batches;

assigning a respective alternative path to each agent in the set of active agents based on the batch assignment; and transmitting the assigned alternative paths to the active agents.

2. The method of claim 1, wherein the active agents are each operatively associated with the path of a respective vehicle that is in the traffic network.

3. The method of claim 1, wherein the active agents comprise automated vehicles.

4. The method of claim 1, wherein obtaining the current state of the traffic network comprises receiving traffic information from a plurality of traffic sensors.

5. The method of claim 1, wherein obtaining the current state of the traffic network comprises receiving traffic information from the active agents.

6. The method of claim 1, wherein the batch assignment function comprises a function that identifies a path that minimizes an estimate of total travel time for the batch.

7. The method of claim 6, wherein the estimate of total travel time for the batch is based on evaluating combinations of alternative paths using a Monte Carlo tree search.

8. A system for system-optimal traffic routing, comprising:

one or more processors;

a memory device operatively coupled to the one or more processors and storing computer-executable instructions which, when executed by the one or more processors, cause the system to perform functions that include:

obtaining a current state of a traffic network;

determining a set of active agents in the traffic network that are configured to request and receive a system optimal route, wherein each of the active agents corresponds to a vehicle of a set of vehicles in the traffic network;

applying a batching function to the set of vehicles implementing a route-finding algorithm to create a batch of vehicles for route replanning;

creating, from the batch of vehicles for replanning, sub-batches based on a spatial relationship between the vehicles and temporal relationships between the vehicles, wherein the spatial relationship between the vehicles predicts whether the vehicles intersect spatially, and wherein the temporal relationship between the vehicles predicts whether the vehicles will intersect temporally;

ranking the sub-batches according to a respective likelihood that each sub-batch will improve network congestion with the system optimal route;

setting a parameter that establishes a number of highest ranked sub-batches to continue with the route replanning;

for the number of the highest ranked sub-batches, generating a plurality of alternative paths for each of the highest ranked sub-batches, wherein the plurality of alternative paths are identified using a tree search configured to limit a spatial overlap of the alternative paths;

generating a batch assignment for each of the highest ranked sub-batches;

assigning a respective alternative path to each agent in the set of active agents based on the batch assignment function; and transmitting the assigned alternative paths to the active agents.

9. The system of claim 8, wherein the active agents are each operatively associated with the path of a respective vehicle that is in the traffic network.

10. The system of claim 8, wherein the active agents comprise automated vehicles.

11. The system of claim 8, wherein obtaining the current state of a traffic network comprises receiving traffic information from a plurality of traffic sensors.

12. The system of claim 8, wherein obtaining the current state of a traffic network comprises receiving traffic information from the active agents.

13. The system of claim 8, wherein the batch assignment function comprises a function that identifies a path that minimizes an estimate of total travel time for the batch.

14. The system of claim 13, wherein the estimate of total travel time for the batch is based on evaluating combinations of alternative paths using a Monte Carlo tree search.

* * * * *